US012787027B2

(12) United States Patent
Ganesan et al.

(10) Patent No.: US 12,787,027 B2
(45) Date of Patent: Nov. 3, 2026

(54) MODIFYING L1 PARAMETERS FOR CONFIGURED GRANT RESOURCE

(71) Applicant: Lenovo (Singapore) Pte. Ltd., New Tech Park (SG)

(72) Inventors: Karthikeyan Ganesan, Kronberg im Taunus (DE); Hyejung Jung, Northbrook, IL (US); Ankit Bhamri, Rödermark (DE); Vijay Nangia, Woodridge, IL (US); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 460 days.

(21) Appl. No.: 18/548,207

(22) PCT Filed: Feb. 28, 2022

(86) PCT No.: PCT/IB2022/051755
§ 371 (c)(1),
(2) Date: Aug. 28, 2023

(87) PCT Pub. No.: WO2022/180618
PCT Pub. Date: Sep. 1, 2022

(65) Prior Publication Data

US 2024/0147496 A1 May 2, 2024

Related U.S. Application Data

(60) Provisional application No. 63/154,610, filed on Feb. 26, 2021.

(51) Int. Cl.

*H04W 72/232* (2023.01)
*H04W 72/1268* (2023.01)
*H04W 72/56* (2023.01)

(52) U.S. Cl.
CPC ..... *H04W 72/232* (2023.01); *H04W 72/1268* (2013.01); *H04W 72/56* (2023.01)

(58) Field of Classification Search
CPC ........... H04W 72/232; H04W 72/1268; H04W 72/56; H04W 72/23; H04L 5/0046; H04L 5/0051; H04L 5/0053
See application file for complete search history.

(56) References Cited

U.S. PATENT DOCUMENTS

2019/0075589 A1* 3/2019 Jeon ...................... H04L 1/1864
2020/0260486 A1* 8/2020 Zhou ................ H04W 28/0278
(Continued)

OTHER PUBLICATIONS

PCT/IB2022/051755, "International Search Report and the Written Opinion of the International Searching Authority, or the Declaration", International Searching Authority, Jun. 2, 2022, pp. 1-13.
(Continued)

*Primary Examiner* — Kiet Tang
(74) *Attorney, Agent, or Firm* — Kunzler Needham Hilton

(57) ABSTRACT

Apparatuses, methods, and systems are disclosed for modifying L1 parameters for a configured grant (CG) resource. One apparatus includes a processor and a transceiver that receives a radio resource control (RRC) configuration for an uplink (UL) Type-2 CG resource and further receives a first downlink control information (DCI) to activate the UL Type-2 CG resource. Via the transceiver, the processor performs a first physical uplink shared channel (PUSCH) transmission on the activated UL Type-2 CG resource according to parameters configured by the RRC configuration and/or the first DCI. Via the transceiver, the processor receives a second DCI that updates a L1 parameter for the activated UL Type-2 CG resource and performs a second PUSCH transmission on the activated UL Type-2 CG resources according to the L1 parameter updated by the second DCI.

20 Claims, 12 Drawing Sheets

(56) References Cited

U.S. PATENT DOCUMENTS

| | | | | |
|---|---|---|---|---|
| 2021/0029706 | A1* | 1/2021 | Zhou | H04L 1/1874 |
| 2021/0184812 | A1* | 6/2021 | MolavianJazi | H04L 1/0041 |

OTHER PUBLICATIONS

Nokia et al., "On Configured Grant enhancements for NR URLLC", 3GPP TSG RAN WG1 Meeting #94 R1-1808570, Aug. 2-24, 2018, pp. 1-6.

Fujitsu, "Clarification on UE behavior with no transmission of UL-SCH", 3GPP TSG RAN WG1#100-e R1-2000579, Feb. 24-Mar. 6, 2020, pp. 1-3.

Nokia et al., "Views on RAN Enhancement for New QoS Parameters", 3GPP TSG-RAN WG2 Meeting #113 Electronic R2-2100718, Jan. 25-Feb. 5, 2021, pp. 1-6.

Nokia et al., "Summary of Agenda Item 8.5.4: RAN enhancements based on new QoS", 3GPP TSG-RAN WG2 Meeting #113 Electronic R2-2102254, Jan. 25-Feb. 5, 2021, pp. 1-5.

3GPP, "3rd Generation Partnership Project; Technical Specification Group Services and System Aspects; Study on Communication for Automation in Vertical Domains (Release 16)", 3GPP TR 22.804 V16.3.0, Jul. 2020, pp. 1-197.

3GPP, "3rd Generation Partnership Project; Technical Specification Group Radio Access Network; NR; Physical layer procedures for control (Release 16)", 3GPP TS 38.213 V16.4.0, Dec. 2020, pp. 1-181.

3GPP, "3rd Generation Partnership Project; Technical Specification Group Radio Access Network; NR; Radio Resource Control (RRC) protocol specification (Release 16)", 3GPP TS 38.331 V16.3.1, Jan. 2021, pp. 1-932.

* cited by examiner

```
-- ASN1START
-- TAG-CONFIGUREDGRANTCONFIG-START

ConfiguredGrantConfig ::=         SEQUENCE {
   frequencyHopping                  ENUMERATED { intraSlot, interSlot}               OPTIONAL, -- Need S
   cg-DMRS-Configuration             DMRS-UplinkConfig,
   mcs-Table                         ENUMERATED { qam256, qam64LowSE}                 OPTIONAL, -- Need S
   mcs-TableTransformPrecoder        ENUMERATED { qam256, qam64LowSE}                 OPTIONAL, -- Need S
   uci-OnPUSCH                       SetupRelease { CG-UCI-OnPUSCH }                  OPTIONAL, -- Need M
   resourceAllocation                ENUMERATED { resourceAllocationType0, resourceAllocationType1,
                                                  DynamicSwitch },
   rbg-Size                          ENUMERATED {config2}                             OPTIONAL, -- Need S
   powerControlLoopToUse             ENUMERATED {n0, n1},
   p0-PUSCH-Alpha                    P0-PUSCH-AlphaSetId,
   transformPrecoder                 ENUMERATED {enabled, disabled}                   OPTIONAL, -- Need S
   nrofHARQ-Processes                INTEGER(1..16),
   repK                              ENUMERATED { n1, n2, n4, n8},
   repK-RV                           ENUMERATED { s1-0231, s2-0303, s3-0000}          OPTIONAL, -- Need R
   Periodicity                       ENUMERATED { sym2, sym7, sym1x14, sym2x14, sym4x14, sym5x14, sym8x14,
                                                  sym10x14, sym16x14, sym20x14, sym32x14, sym40x14, sym64x14,
                                                  sym80x14, sym128x14, sym160x14, sym256x14, sym320x14,
                                                  sym512x14, sym640x14, sym1024x14, sym1280x14, sym2560x14,
                                                  sym5120x14, sym6, sym1x12, sym2x12, sym4x12, sym5x12,
                                                  sym8x12, sym10x12, sym16x12, sym20x12, sym32x12, sym40x12,
                                                  sym64x12, sym80x12, sym128x12, sym160x12, sym256x12,
                                                  sym320x12, sym512x12, sym640x12, sym1280x12, sym2560x12
                                     },
   configuredGrantTimer              INTEGER (1..64)                                  OPTIONAL, -- Need R

... continued
```

FIG. 7A

```
-- ASN1START
-- TAG-CONFIGUREDGRANTCONFIG-START
ConfiguredGrantConfig ::=          SEQUENCE {

... continued

   rrc-ConfiguredUplinkGrant          SEQUENCE {
      timeDomainOffset                   INTEGER (0..5119),
      timeDomainAllocation               INTEGER (0..15),
      frequencyDomainAllocation          BIT STRING (SIZE(18)),
      antennaPort                        INTEGER (0..31),
      dmrs-SeqInitialization             INTEGER (0..1)                             OPTIONAL, -- Need R
      precodingAndNumberOfLayers         INTEGER (0..63),
      srs-ResourceIndicator              INTEGER (0..15)                            OPTIONAL, -- Need R
      mcsAndTBS                          INTEGER (0..31),
      frequencyHoppingOffset             INTEGER (1.. maxNrofPhysicalResourceBlocks-1)    OPTIONAL, -- Need R
      pathlossReferenceIndex             INTEGER (0..maxNrofPUSCH-PathlossReferenceRSs-1),
      ...,
      [[
      pusch-RepTypeIndicator-r16          ENUMERATED {pusch-RepTypeA,pusch-RepTypeB}      OPTIONAL, -- Need M
      frequencyHoppingPUSCH-RepTypeB-r16  ENUMERATED {interRepetition, interSlot}   OPTIONAL,-- Cond RepTypeB
      timeReferenceSFN-r16                ENUMERATED {sfn512}                             OPTIONAL, -- Need S
      ]]
   }
}

CG-UCI-OnPUSCH ::=                 CHOICE {
   dynamic                            SEQUENCE ( SIZE (1..4)) OF BetaOffsets,
   semiStatic                         BetaOffsets
}
-- TAG-CONFIGURATIONGRANTCONFIG-STOP
-- ASN1STOP
```

FIG. 7B

MODIFYING L1 PARAMETERS FOR CONFIGURED GRANT RESOURCE

CROSS-REFERENCE TO RELATED APPLICATIONS

This application claims priority to U.S. Provisional Patent Application No. 63/154,610 entitled "SEMI-PERSISTENT BASED MODIFICATION OF L1 PARAMETERS FOR TYPE-2 CG RESOURCE" and filed on Feb. 26, 2021, for Karthikeyan Ganesan, Hyejung Jung, Ankit Bhamri, Vijay Nangia, and Ravi Kuchibhotla, which application is incorporated herein by reference.

FIELD

The subject matter disclosed herein relates generally to wireless communications and more particularly relates to semi-persistent based modification of Layer-1 ("L1") parameters for Type-2 Configured Grant ("CG") resource.

BACKGROUND

Certain wireless networks support semi-persistent grants of resources, such as a Configured Grant ("CG"). A CG is a type of grant-free uplink transmission feature, e.g., uplink data transmission without resource request. A CG can avoid the regular handshake delay, e.g., sending the scheduling request and waiting for uplink ("UL") grant allocation. In current Third Generation Partnership Project ("3GPP") New Radio ("NR") design, two types of configured grants are supported: Type-1 and Type-2. For Type-1 CG, the uplink grant configuration and activation/deactivation are provided by Radio Resource Control ("RRC") signaling. For Type-2 CG, the uplink grant configuration is provided via RRC signaling and its activation/deactivation is provided via Downlink Control Information ("DCI").

BRIEF SUMMARY

Disclosed are procedures for modifying L1 parameters for CG resource. Said procedures may be implemented by apparatus, systems, methods, or computer program products.

One method at a User Equipment ("UE") for modifying L1 parameters for CG resource includes acquiring channel occupancy for a license-exempt channel and transmitting a first UL transmission during a first set of time units, where the channel occupancy has a maximum duration. The method includes determining a priority of pending uplink transmissions capable of transmission during a remainder of the channel occupancy and releasing the acquired channel occupancy after the first set of time units and prior to a nominal end of the acquired channel occupancy in response to the priority of pending uplink transmissions being less than a priority threshold.

One method at a radio access network ("RAN") for modifying L1 parameters for CG resource includes configuring a UE with a configuration for releasing a Channel Occupancy. The method includes receiving a first uplink transmission over a first set of time units during a UE-initiated Channel Occupancy and determining that the UE releases the UE-initiated Channel Occupancy.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7A is a diagram illustrating one embodiment of an RRC information element ("IE") for configured grant configuration;

FIG. 7B is a continuation of the IE of FIG. 7A;

DETAILED DESCRIPTION

Figure 1:
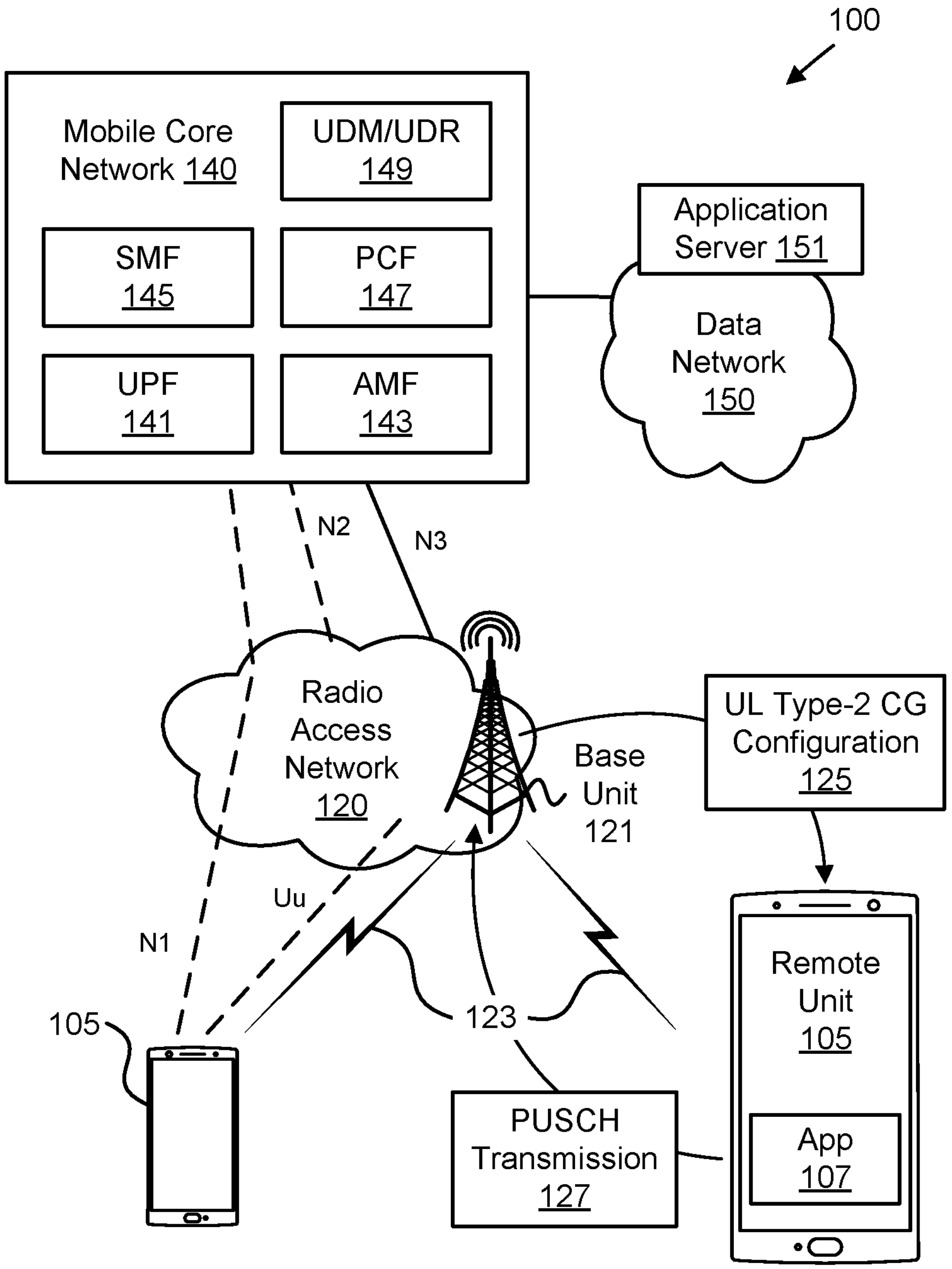
FIG. 1 is a block diagram illustrating one embodiment of a wireless communication system for modifying L1 parameters for CG resource.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, "one or more of A, B and C" includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for modifying L1 parameters for a Type-2 configured grant ("CG") resource. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

In the current NR design, Type-2 CG parameters are configured using RRC signaling and activated using DCI. However, the parameters for CG such as enabling repetition, number of repetition, beam/spatial relationship cannot be modified or adjusted once activated using DCI.

Disclosed herein are solutions for modifying or adjusting some of the parameters of the uplink CG resource using dynamic signaling, for example in scenarios such as survival time where high reliability enhancements are needed. The solutions may be implemented by apparatus, systems, methods, or computer program products. As used herein, the term "survival time" refers to the time duration for which data sent between communicating applications (transmitting and receiving) can be lost without affecting normal operation.

In periodic communication, survival time is often given as the number of lost messages. Any value above this threshold results in failure. Table 1 depicts motion control use case requirements for Communication Service Availability ("CSA"), as described in 3GPP Technical Report ("TR") 22.804.

TABLE 1

| CSA | E2E Latency | Message size [bytes] | Transfer Interval [ms] | Survival time [ms] | No of UEs | speed |
|---|---|---|---|---|---|---|
| 99.9999% to 99.999999% | <transfer interval | 40 | 1 ms | 1 ms | <=50 | <20 m/s |
| 99.9999% to 99.999999% | <transfer interval | 50 | 0.5 ms | 0.5 ms | <=20 | <20 m/s |
| 99.9999% to 99.999999% | <transfer interval | 20 | 2 ms | 2 ms | <=100 | <20 m/s |

One solution includes modifying one or more L1 parameters such as repetition, Transmission Configuration Indicator ("TCI") state, priority indicator, P0 and alpha (Open-loop power control parameters) associated with a Type-2 CG resource for a previously activated Type-2 CG resource using DCI.

In one embodiment, the UE may discard/ignore fields used for validating a DCI for activation such as redundancy version and/or Hybrid Automatic Repeat Request ("HARQ") process number and L1 parameters present in the DCI may be applied for Physical Uplink Shared Channel ("PUSCH") transmission from the next CG resource.

In one embodiment, a time domain resource allocation field in the DCI may be used to signal the row index indicating the number of repetition otherwise the number of bits associated with the time domain resource allocation field indicate 'k' number of repetition. However, the UE may continue to use the time domain allocation of $K_2$ offset, start and length indicator ("SLIV"), mapping type as configured using RRC signaling.

In one embodiment, a high priority Configured Grant ("CG") PUSCH (i.e., priority indicator in DCI is set to highest value) in the dynamic flexible symbols. Here, features like HARQ ACK/NACK deferral ($kl+kl_{def}$) and/or Semi-Persistent Scheduling ("SPS") ACK/NACK skipping may be disabled during survival time, which may be signaled using the activation DCI. As used herein, "HARQ-ACK" may represent collectively the Positive Acknowledge ("ACK") and the Negative Acknowledge ("NACK") and Discontinuous Transmission ("DTX"). ACK means that a Transmission Block ("TB") is correctly received while NACK (or NAK) means a TB is erroneously received and DTX means that no TB was detected.

FIG. 1 depicts a wireless communication system 100 for modifying L1 parameters for CG resource, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Furthermore, the UL communication signals may comprise one or more uplink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a to Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a PDN Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121.

Note that during NR operation on unlicensed spectrum (referred to as "NR-U"), the base unit 121 and the remote unit 105 communicate over unlicensed (i.e., shared) radio spectrum. Similarly, during LTE operation on unlicensed spectrum (referred to as "LTE-U"), the base unit 121 and the remote unit 105 also communicate over unlicensed (i.e., shared) radio spectrum. For operation in unlicensed spectrum (e.g., NR-U or LTE-U), when a remote unit 105 or base unit 121 wants to transmit, it has to detect the energy level at a designated time for duration equal to a CCA period. If the energy level in the channel is below the CCA threshold, then the equipment can transmit for duration equal to the COT. After that, if the equipment wishes to continue its transmission, it has to repeat the CCA process.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Spectrum ("NAS") signaling, NAS ciphering and integrity protection, registration management, connection management, mobility management, access authentication and authorization, security context management. The SMF 145 is responsible for session management (i.e., session establishment, modification, release), remote unit (i.e., UE) Internet Protocol ("IP") address allocation and management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for modifying L1 parameters for CG resource apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

Communication devices, such as the remote unit 105 may be configured by the RAN 120 with a UL Type-2 CG configuration 125. As described above, a base unit 121 transmits activation DCI to activate the UL Type-2 CG. The remote unit 105 may then transmit PUSCH 127 to the base unit 121 according to the UL Type-2 CG configuration 125.

In some embodiments, the base unit 121 may send additional DCI to modify L1 parameters of the UL Type-2 CG configuration 125, as described in further detail below.

In the following descriptions, the term "gNB" is used for the base station/base unit, but it is replaceable by any other radio access node, e.g., RAN node, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for modifying L1 parameters for CG resource.

Figure 2:
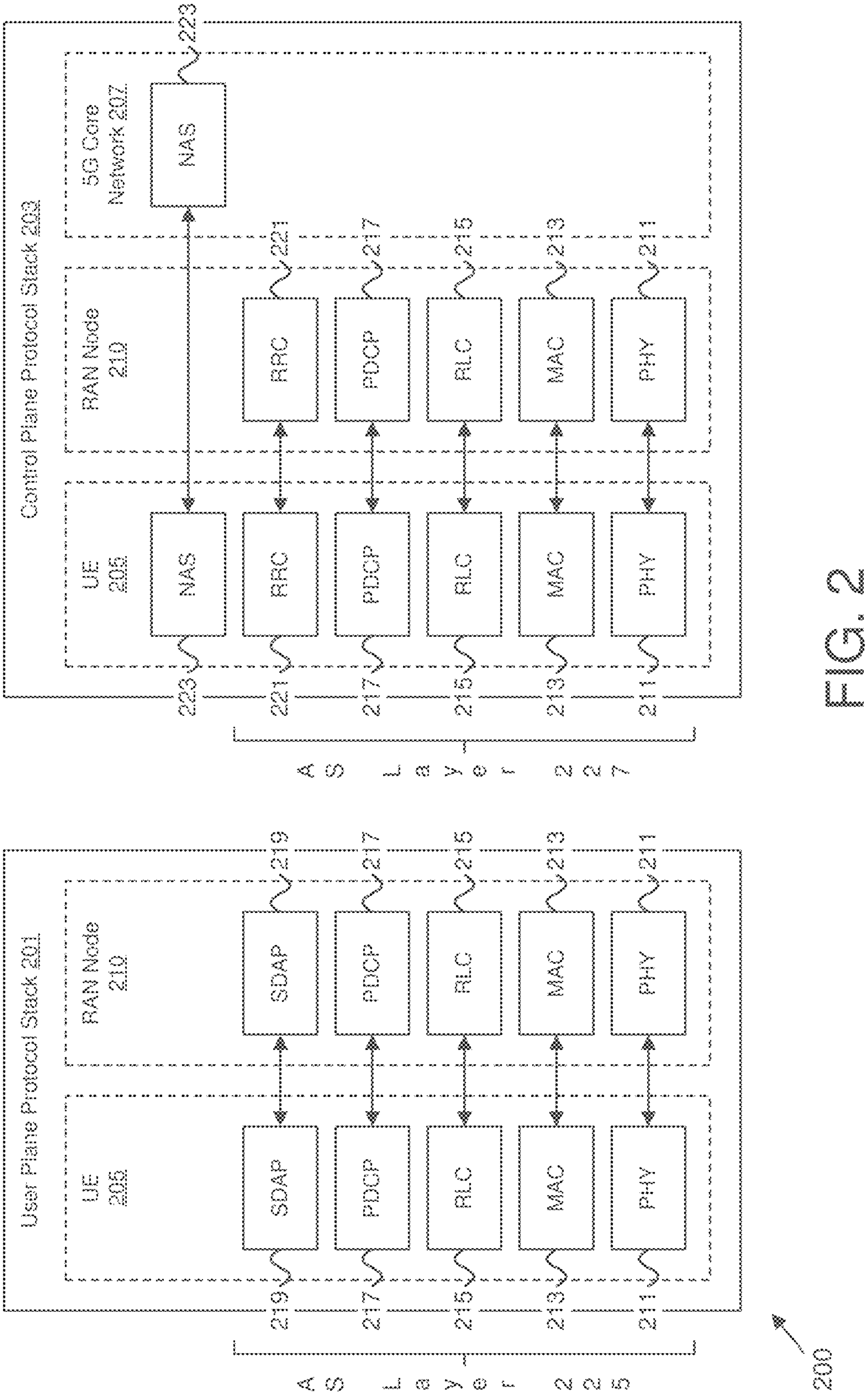
FIG. 2 is a diagram illustrating one embodiment of a 3GPP NR protocol stack.

FIG. 2 depicts a NR protocol stack 200, according to embodiments of the disclosure. While FIG. 2 shows a UE 205, a RAN node 210 and the 5G core network 207, these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 211, a Medium Access Control ("MAC") sublayer 213, a Radio Link Control ("RLC") sublayer 215, a Packet Data Convergence Protocol ("PDCP") sublayer 217, and Service Data Adaptation Protocol ("SDAP") layer 219. The Control Plane protocol stack 203 includes a PHY layer 211, a MAC sublayer 213, a RLC sublayer 215, and a PDCP sublayer 217. The Control Plane protocol stack 203 also includes a Radio Resource Control ("RRC") layer 221 and a Non-Access Stratum ("NAS") layer 223.

The AS layer 225 (also referred to as "AS protocol stack") for the User Plane protocol stack 201 consists of at least SDAP, PDCP, RLC and MAC sublayers, and the physical layer. The AS layer 227 for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 221 and the NAS layer 223 for the control plane and includes, e.g., an Internet Protocol ("IP") layer or PDU Layer (note depicted) for the user plane. L1 and L2 are referred to as "lower layers," while L3 and above (e.g., transport layer, application layer) are referred to as "higher layers" or "upper layers."

The PHY layer 211 offers transport channels to the MAC sublayer 213. The MAC sublayer 213 offers logical channels to the RLC sublayer 215. The RLC sublayer 215 offers RLC channels to the PDCP sublayer 217. The PDCP sublayer 217 offers radio bearers to the SDAP sublayer 219 and/or RRC layer 221. The SDAP sublayer 219 offers QoS flows to the core network (e.g., 5GC). The RRC layer 221 provides for the addition, modification, and release of Carrier Aggregation ("CA") and/or Dual Connectivity ("DC"). The RRC layer 221 also manages the establishment, configuration, maintenance, and release of Signaling Radio Bearers ("SRBs") and Data Radio Bearers ("DRBs").

The MAC layer 213 is the lowest sublayer in the Layer-2 architecture of the NR protocol stack. Its connection to the PHY layer 211 below is through transport channels, and the connection to the RLC layer 215 above is through logical channels. The MAC layer 213 therefore performs multiplexing and demultiplexing between logical channels and transport channels: the MAC layer 213 in the transmitting side constructs MAC PDUs, known as transport blocks, from MAC Service Data Units ("SDUs") received through logical channels, and the MAC layer 213 in the receiving side recovers MAC SDUs from MAC PDUs received through transport channels.

The MAC layer 213 provides a data transfer service for the RLC layer 215 through logical channels, which are either control logical channels which carry control data (e.g., RRC signaling) or traffic logical channels which carry user plane data. On the other hand, the data from the MAC layer 213 is exchanged with the PHY layer 211 through transport channels, which are classified as downlink or uplink. Data is multiplexed into transport channels depending on how it is transmitted over the air.

The PHY layer 211 is responsible for the actual transmission of data and control information via the air interface, i.e., the PHY layer 211 carries all information from the MAC transport channels over the air interface on the transmission side. Some of the important functions performed by the PHY layer 211 include coding and modulation, link adaptation (e.g., Adaptive Modulation and Coding ("AMC")), power control, cell search (for initial synchronization and handover purposes) and other measurements (inside the 3GPP system (i.e., NR and/or LTE system) and between systems) for the RRC layer 221. The PHY layer 211 performs transmissions based on transmission parameters, such as the modulation scheme, the coding rate (i.e., the modulation and coding scheme ("MCS")), the number of physical resource blocks, etc.

According to embodiments of the first solution, one or more configured and/or dynamically indicated L1 parameters such as repetition (e.g., the number of repetitions), a TCI state (or an Sounding Reference Signal ("SRS") resource indicator), precoding and number of layers, a priority indicator, a MCS table, P0 and/or alpha (i.e., open-loop power control parameters) associated with a Type-2 CG resource or UL Type-2 CG configuration can be modified based on one DCI signaling instead of using a RRC reconfiguration message or using deactivation and re-activation DCI formats or UL Type-2 CG configuration. In this case, MAC control element ("CE") confirmation message is not sent for the corresponding Type-2 CG resource or UL Type-2 CG configuration.

In one implementation, Type-2 CG activation DCI could be used to modify one or more L1 parameters such as number of repetitions, TCI state (or SRS resource indicator), precoding and number of layers, priority indicator, P0 and/or alpha values associated with a Type-2 CG resource. When a UE 205 receives a 'second' Type-2 CG activation DCI corresponding to the previously (i.e., first activation DCI) activated Type-2 CG resource, the UE 205 could discard/ignore fields used for validating a DCI for activation such as redundancy version and/or HARQ process number and L1 parameters present in the DCI could be applied for PUSCH transmission from the next CG resource (e.g., from the first PUSCH after 'second' Type-2 CG activation DCI).

Figure 3:
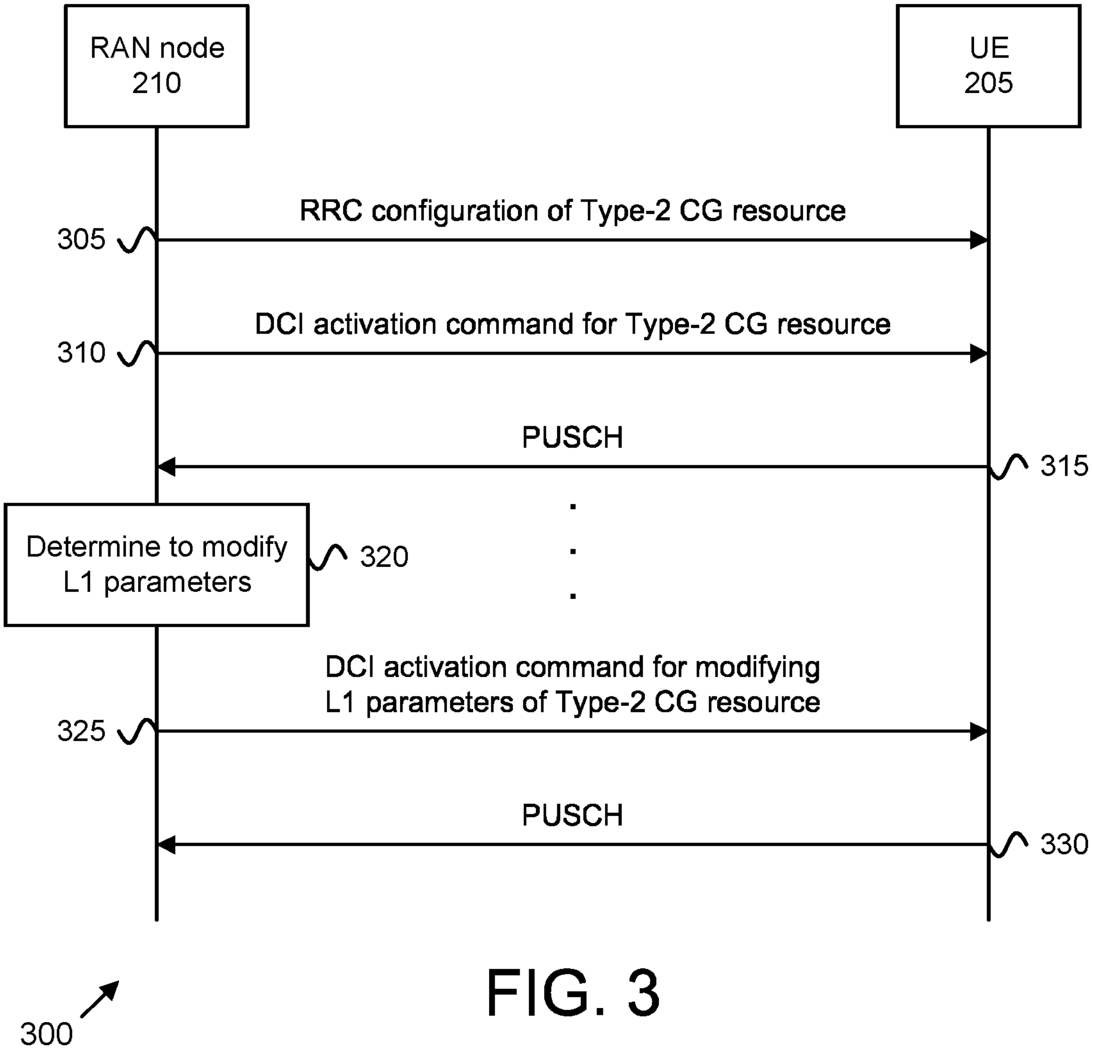
FIG. 3 is a diagram illustrating one embodiment of a procedure for modifying L1 parameters using activation DCI.

In one example, after failing to decode PUSCH in the CG resource or failing to decode 'N' consecutive PUSCHs in CG resources, a RAN node could transmit an activation DCI to modify L1 parameters of the CG resource to increase the reliability of the next PUSCH transmission in the same CG resource (or CG configuration) as shown in FIG. 3.

In some implementations, the UE 205 receives the DCI to update the L1 parameters for the already (previously) activated UL Type-2 CG and the L1 parameters are applied to the CG resources after a time-offset (configured by network) from the instance when DCI is received. For example, if the time-offset is two slots, then the updated L1 parameters are applied to CG resources after two slots from the slot when DCI is received. In some implementation, the time-offset can be based on a processing capability of the UE 205 (such as value of N2).

In some embodiments, the L1 parameters updated by DCI are applied only for a fixed duration of time, after which the parameters indicated by the activating DCI are applied again. For example, if the duration for applying updated L1 parameters is five slots, then the CG resources within the five slots apply the updated L1 parameters, after which the parameters are updated back according to the activating DCI. In one implementation, updated TCI (or an SRS resource indicator) could be continued for transmitting the CG beyond the predefined time.

In some embodiments, the L1 parameters for UL Type-2 CG can be updated jointly by DCI that is used to schedule dynamic grant PUSCH (such as DCI format 0_1, 0_2). In this case, no separate DCI is needed for updating the L1 parameters of the already activated Type-2 CG resources. The dynamic grant ("DG") scheduling DCI can be enhanced with a 1-bit field to indicate if the L1 parameters are also applied for updating the already activated CG resources, for example if no such bit field is configured or '0' is indicated, then the L1 parameters are not activated for the Type-2 CG resources, if '1' is indicated for the bit field, then the L1 parameters are also applied to update the Type-2 CG resources.

In some implementations, only a subset of the L1 parameters is allowed to be modified with the remaining L1 parameters in the DCI set to a predetermined value. This can be used to distinguish (from the initial Type-2 CG activation DCI) and additionally validate (in addition to the redundancy version and/or HARQ process number for Type-2 CG PDCCH validation fields) the 'second' or 'modification' Type-2 CG activation DCI for an already activated CG configuration. In another implementation, the 'second' or 'modification' Type-2 CG activation DCI may be scrambled by a new Radio Network Temporary Identifier ("RNTI") parameter "cs-mod-RNTI" (e.g., with validation based on the redundancy version and/or HARQ process number validation fields).

In another implementation, time domain resource allocation field in the DCI could be used to signal the row index indicating the number of repetition or the value of the bits associated with the time domain resource allocation field can be reinterpreted to indicate 'k' number of repetition. In these cases, however, the UE 205 could continue to use the time domain allocation of K2 offset, start and length indicator ("SLIV"), mapping type indicated in/corresponding to the initial Type-2 CG activation DCI for the CG configuration and time domain allocation list as configured using RRC signaling. In one implementation, if type of repetition (Type A or Type B) and number of repetition 'k' is configured using RRC signaling then activation DCI signaling only changes the 'k' number of repetitions. In another implementation, if type of repetition (Type A or Type B) and number of repetition 'k' is not configured using RRC signaling then activation DCI signaling indicate the type of repetition and 'k' number of repetitions. In another implementation, if the Redundancy Version ("RV") pattern is not provided then the UE 205 could choose the RV pattern of {0,0,0,0} for the transmission of PUSCH repetition.

In one implementation, UL TCI state or associated SRS Resource Indicator ("SRI") could be used to signal the UL beam or Transmission and Reception Point ("TRP") for PUSCH transmission in the same CG resource. In another implementation, SRI could be used to select different panels for the transmission of PUSCH using the same CG resource.

In another implementation, UL TCI state or associated SRI could be used to signal the transmission of PUSCH using a CG resource to different TRP.

In another implementation, after failing to decode PUSCH in the CG resource (or failing to decode 'N' consecutive PUSCH in CG resources) or when survival timer starts, the RAN node could increase the priority of the CG transmission by modifying the priority indication in the DCI and such increase in the priority value could increase the reliability of the PUSCH transmission (e.g., avoid or reduce the cancellation of PUSCH due to overlap in time with other UL channels and/or signals) corresponding to other UL physical channel such as SRS; PUCCH for the intra-UE multiplexing. In one implementation, priority value is reverted to the RRC configured priority value after receiving ACK, or 'N' consecutive ACK, or expiry of the survival timer.

In another implementation, open-loop power control parameter set indication in the DCI could indicate P0 and/or alpha for the transmission of PUSCH in the same CG resource.

FIG. 3 depicts an exemplary procedure 300 for modifying L1 parameters using activation DCI, according to embodiments of the first solution. The procedure 300 involves the RAN node 210 (e.g., one embodiment of the base unit 121) and the UE 205 (e.g., one embodiment of the remote unit 105).

The procedure 300 begins and the RAN node 210 sends to the UE 205 an RRC configuration of Type-2 CG resources (see messaging 305). The RAN node 210 also sends a first DCI activation command for the configured Type-2 CG resource (see messaging 310).

During a CG transmission opportunity, the UE 205 performs PUSCH transmission using the configured CG resources (see messaging 315). The UE 205 may perform one or more PUSCH transmissions on CG resources, including one or more repetitions, as discussed in further detail below.

The RAN node 210 determines to modify one or more L1 parameters (see block 320). For example, the RAN node 210 after failing to decode PUSCH in the CG resource or failing to decode 'N' consecutive PUSCHs in CG resources may decide to modify L1 parameters of the CG resource to increase the reliability of the next PUSCH transmission in the same CG resource.

Accordingly, the RAN node 210 sends a second DCI activation command to the UE 205 to modify L1 parameters of the CG resource to increase the reliability of the next PUSCH transmission in the same CG resource (see messaging 325). During a next CG transmission opportunity, the UE 205 then performs PUSCH transmission on the configured CG resources using the modified L1 parameters (see messaging 330).

Figure 4:
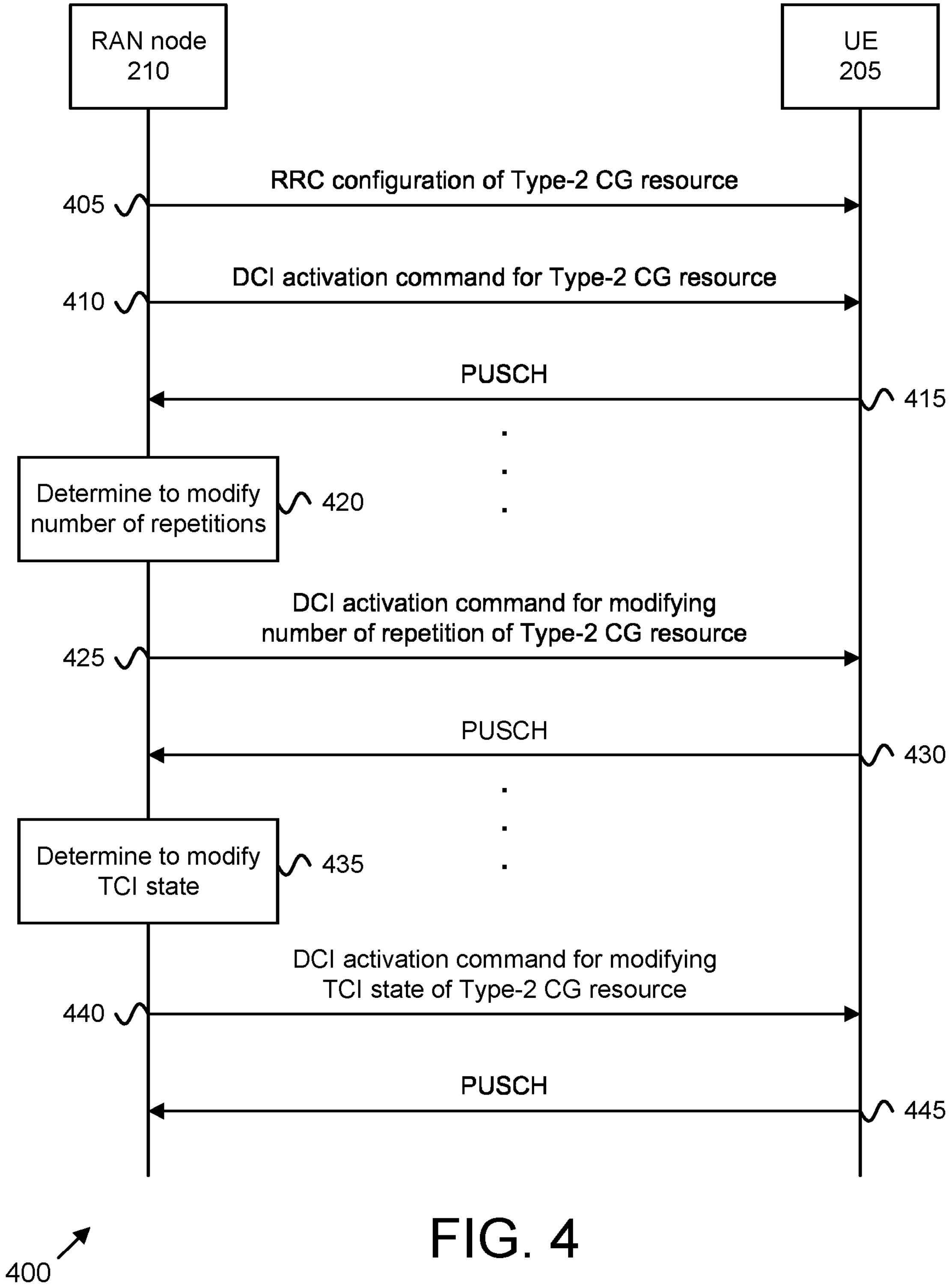
FIG. 4 is a diagram illustrating another embodiment of a procedure for modifying L1 parameters using activation DCI.

FIG. 4 depicts an exemplary procedure 400 for modifying L1 parameters using activation DCI, according to another implementation of the first solution. The procedure 400 involves the RAN node 210 and the UE 205. Here, the RAN node 210 transmits multiple activation DCI for the same CG resource to signal the modification of a plurality of L1 parameters.

The procedure 400 begins and the RAN node 210 sends to the UE 205 an RRC configuration of Type-2 CG resources (see messaging 405). The RAN node 210 also sends a first DCI activation command for the configured Type-2 CG resource (see messaging 410).

During a CG transmission opportunity, the UE 205 performs PUSCH transmission using the configured CG resources (see messaging 415). The UE 205 may perform one or more PUSCH transmissions on CG resources, including one or more repetitions, as discussed in further detail below.

The RAN node 210 determines to modify the number of repetitions of a PUSCH transmission (see block 420). For example, the RAN node 210 after failing to decode PUSCH in the CG resource or failing to decode 'N' consecutive PUSCHs in CG resources may decide to modify the number of repetitions of a PUSCH transmission to increase the reliability of the next PUSCH transmission in the same CG resource.

Accordingly, the RAN node 210 sends a second DCI activation command to the UE 205 to modify L1 parameters of the CG resource to increase the reliability of the next PUSCH transmission in the same CG resource (see messaging 425). During a next CG transmission opportunity, the UE 205 then performs PUSCH transmission on the configured CG resources using the modified number of repetitions (see messaging 430).

However, in the procedure 400 the RAN node 210 further determines to also modify the TCI state of a PUSCH transmission (see block 435). For example, if the RAN node 210 is still unable to decode PUSCH in the CG resource then it may decide to modify the TCI of a PUSCH transmission to increase the reliability of the next PUSCH transmission in the same CG resource.

Accordingly, the RAN node 210 sends a third DCI activation command to the UE 205 to modify L1 parameters of the CG resource to increase the reliability of the next PUSCH transmission in the same CG resource (see messaging 440). During a next CG transmission opportunity, the UE 205 then performs PUSCH transmission on the configured CG resources using the modified TCI state (see messaging 445). Note that this latest PUSCH transmission may have both the number of repetition and the TCI state modified from the original parameter values transmitted in the RRC message.

In another implementation, a new overriding CG resource configuration using DCI activation includes a set of L1 parameters signaled using RRC and specify one or more L1 parameters that could be allowed to change for the same CG resource using the DCI activation.

In some embodiments, one or more configuration of L1 parameters for the Type-2 CG resource could be modified using DCI scrambled using Configured Scheduling Radio Network Temporary Identifier ("CS-RNTI"), in this case the UE 205 could ignore the non-toggled new data indicator ("NDI") for retransmission grant, i.e., if the RAN node 210 did not decode PUSCH from the last CG resource but could apply/indicate one or more configuration of L1 parameters for PUSCH transmission of next TB in the CG resource.

In one implementation, the UE 205 is signaled to ignore the retransmission grant. In another implementation, the UE 205 could start the survival time after receiving non-toggled NDI from the RAN node 210 and during survival time (before the expiry of the survival timer), every next TBs are transmitted using higher reliability and hence the one or more configuration of L1 parameters for the Type-2 CG resource could be modified using DCI scrambled using CS-RNTI during survival time.

In some embodiments, to increase the availability of UL symbols for PUSCH transmission during survival time, CG PUSCH repetition is allowed for high priority CG PUSCH (i.e., priority indicator in DCI is set to highest value) in the dynamic flexible symbols. In one example, a UE 205 can be configured with cell-specific flexible symbols as UE-specific UL or UE-specific flexible symbols with tdd-UL-DL-ConfigurationDedicated, which can override flexible symbols of tdd-UL-DL-ConfigurationCommon. Further, the UE 205 may receive an indication of Slot Format Indicator ("SFI") via DCI indicating that the semi-static flexible symbols are dynamic flexible symbols. For the UE-specific UL or UE-specific flexible symbols, there is no Physical Random Access Channel ("PRACH") and/or SRS transmission from any UE is expected, and the UE 205 could use the dynamic flexible symbols for high priority CG PUSCH repetitions.

In some embodiments, time/frequency resource and/or MCS signaled in the RRC could be overwritten by this second DCI field of timing assignment/frequency assignment and/or MCS. In one example, more UL resource could be signaled to the UE 205 during survival time that could make use of larger TB size considering lower MCS. In some embodiment, offset between successive CG resource in a period could be modified using the activation DCI. In some embodiments, the UE 205 could revert back to the RRC configuration after receiving Ack or 'N' consecutive Acks or after a predefined time or survival timer stopped.

In some embodiments, features like HARQ Ack/Nack deferral ($kl+kl_{def}$) and/or SPS Ack/Nack skipping could be disabled during survival time, which could be signaled using the activation DCI or after receiving NACK in the form of non-toggle NDI or Downlink Feedback Indicator ("DFI") for that HARQ process. In another implementation, HARQ Ack/Nack deferral ($kl+kl_{def}$) and/or SPS Ack/Nack skipping could be enabled after receiving Ack or 'N' consecutive Acks or after a predefined time after receiving the activation DCI disabling feature command or non-toggled NDI.

Figures 5A, 5B, 5C:
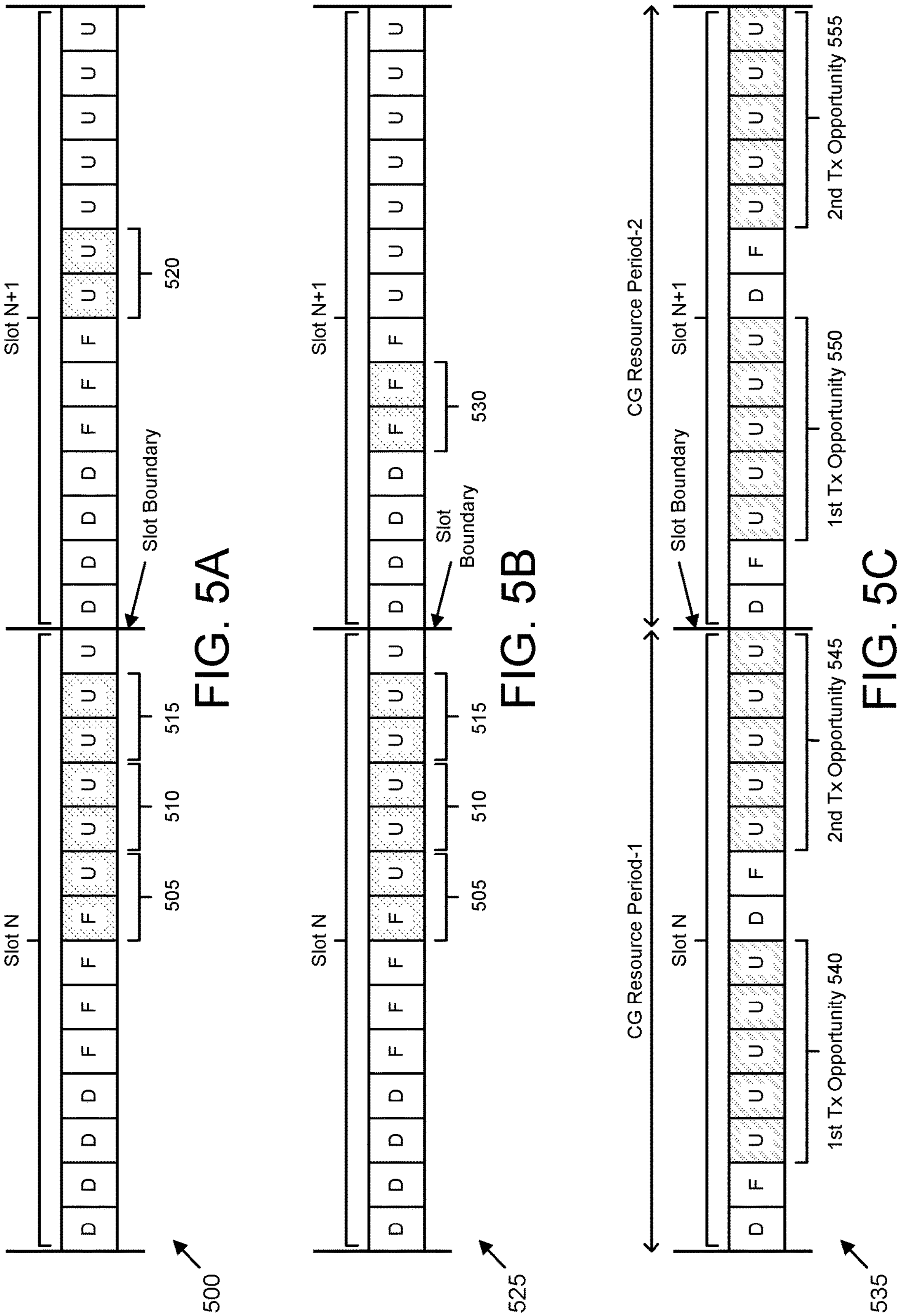
FIG. 5A is a diagram illustrating one embodiment of mini-slot-based repetition.
FIG. 5B is a diagram illustrating another embodiment of multi-segment transmission.
FIG. 5C is a diagram illustrating one embodiment of Repetition Type B.

Regarding URLLC, non-slot-based repetition (Repetition Type B), the following parameters are defined:

- cg-nrojSlots-r16—The number of consecutive slots allocated within a configured grant period
- cg-nrofPUSCH-InSlot-r16—The number of consecutive PUSCH allocations within a slot FIG. 5A depicts one example of a slot arrangement 500 for mini-slot-based repetition. Here, two or more repetitions of a TB can be transmitted within one slot, or across slot boundary in consecutive available slots. The slot arrangement 500 comprises consecutive slots "N" and "N+1". As depicted, slot "N" contains a resource 505 for first repetition, a resource 510 for second repetition, and a resource 515 for third repetition. The resource 505 for first repetition comprises a flexible symbol (denoted "F") and an uplink symbol (denoted "U"), the resource 510 for second repetition and a resource comprises two consecutive uplink symbols, and the resource 515 for third repetition also comprises a pair of consecutive uplink symbols. Further, slot "N+1" contains a resource 520 for fourth repetition which comprises two consecutive uplink symbols. As an example, the CG periodicity may be two symbols, 1st transmission ("Tx") in PUSCH symbol=1 and 2nd Tx Repetitions in PUSCH symbol=2.

FIG. 5B depicts one example of a slot arrangement 525 for multi-segment transmission. Here, two or more repetitions of a TB can be transmitted in consecutive available slots with one or more repetition in each slot and with possibly different starting symbols and/or durations. Different repetitions in different slots can be with different starting symbols and/or durations. The slot arrangement 525 comprises consecutive slots "N" and "N+1". As depicted, slot "N" contains a resource 505 for first repetition, a resource 510 for second repetition, and a resource 515 for third repetition. Further, slot "N+1" contains a resource 530 for fourth repetition which comprises two consecutive uplink symbols. As an example, the CG periodicity may be two symbols, the PUSCH symbol length may be two and the Number of Repetitions may be one.

FIG. 5C depicts on example of a slot arrangement 535 for Repetition Type B. Repetition Type B includes both components of mini-slot-based repetition and multi-segment transmission. The slot arrangement 535 comprises consecutive slots "N" and "N+1". As depicted, slot "N" contains a first Tx opportunity 540 and a second Tx opportunity 545. The first Tx opportunity 540 comprises five consecutive uplink symbols and the second Tx opportunity 545 also comprises five consecutive uplink symbols. Further, slot "N+1" also contains a first Tx opportunity 550 and a second Tx opportunity 555. The first Tx opportunity 550 comprises five consecutive uplink symbols and the second Tx opportunity 555 also comprises five consecutive uplink symbols. Repetition Type B acts like mini-slot repetition and if one mini-slot repetition is across slot boundary, it is segmented as multiple repetition. As another example, CG period is 14 symbols, PUSCH symbol length is five, and number of Repetitions is two.

Figure 6:
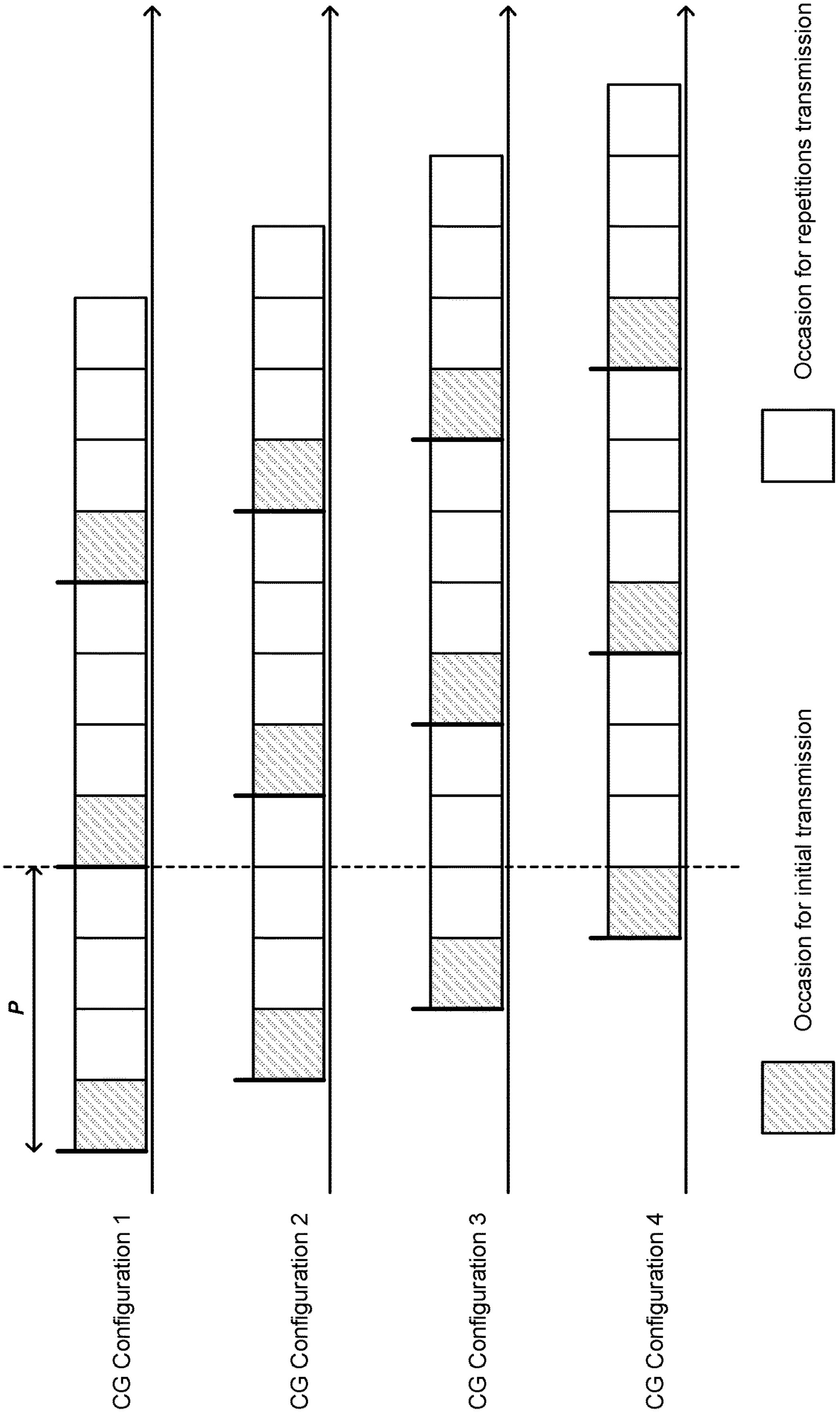
FIG. 6 is a diagram illustrating one embodiment of multiple active configured grant configurations for a given bandwidth part ("BWP") of a serving cell.

FIG. 6 depicts multiple active configured grant configurations for a given BWP of a serving cell. Multiple active configured grant configurations may be supported at least for different services/traffic types and/or for enhancing reliability and reducing latency. The UE 205 is to terminate the repetition of a transport block in a PUSCH transmission if the UE 205 receives a DCI format 0_1 with DFI flag provided and set to '1', and if in this DCI the UE 205 detects ACK for the HARQ process corresponding to that transport block.

For any RV sequence, the repetitions shall be terminated when one of the following conditions is reached: 1) After transmitting K nominal repetitions; or 2) At the last transmission occasion among the K nominal repetitions within the period P; or 3) From the starting symbol of a repetition that overlaps with a PUSCH with the same HARQ process scheduled by DCI format 0_0, 0_1 or 0_2, whichever conditions is reached first.

Regarding rules for RV and repetitions, the higher layer parameter repK-RV defines the redundancy version pattern to be applied to the repetitions. If the parameter cg-RetransmissionTimer is provided, then the redundancy version for uplink transmission with a configured grant is determined by the UE 205. If the parameter repK-RV is provided in the configuredGrantConfig, but the parameter cg-RetransmissionTimer is not provided, then for the nth transmission occasion among K repetitions, n=1, 2, . . . , K, it is associated with $(\mathrm{mod}(n-1,4)+1)^{th}$ value in the configured RV sequence. However, if the parameter repK-RV is not provided in the configuredGrantConfig and if the parameter cg-RetransmissionTimer is not provided, then the redundancy version for uplink transmissions with a configured grant shall be set to 0.

If a configured grant configuration is configured with startingFromRV0-r16 set to 'off', the initial transmission of a transport block may only start at the first transmission occasion of the K repetitions. Otherwise, the initial transmission of a transport block may start at one of: 1) the first transmission occasion of the K repetitions if the configured RV sequence is {0, 2, 3, 1}; or 2) any of the transmission occasions of the K repetitions that are associated with RV=0 if the configured RV sequence is {0, 3, 0, 3}; or 3) any of the transmission occasions of the K repetitions if the configured RV sequence is {0, 0, 0, 0}, except the last transmission occasion when K≥8.

Regarding PDCCH validation for DL SPS and UL grant Type-2, the UE 205 validates, for scheduling activation or scheduling release, a DL SPS assignment PDCCH or a configured UL grant Type-2 PDCCH if: the Cyclic Redundancy Check ("CRC") of a corresponding DCI format is scrambled with a CS-RNTI provided by cs-RNTI, and the new data indicator field in the DCI format for the enabled transport block is set to '0', and the DFI flag field, if present, in the DCI format is set to '0', and if validation is for scheduling activation and if the PDSCH-to-HARQ_feedback timing indicator field in the DCI format is present, the PDSCH-to-HARQ_feedback timing indicator field does not provide an inapplicable value from dl-DataTo UL-ACK-r16.

If a UE 205 is provided a single configuration for UL grant Type-2 PUSCH or for SPS PDSCH, validation of the DCI format is achieved if all fields for the DCI format are set according to Table 2 (taken from 3GPP Technical Specification ("TS") 38.213, Table 10.2-1) or Table 3 (taken from 3GPP TS 38.213, Table 10.2-2). Tables 2 and 3 show special fields for single DL SPS or single UL grant Type-2 scheduling activation PDCCH validation when the UE 205 is provided a single SPS PDSCH or UL grant Type-2 configuration in the active DL/UL BWP of the scheduled cell.

TABLE 2

| | DCI format 0_0/0_1/0_2 | DCI format 1_0/1_2 | DCI format 1_1 |
|---|---|---|---|
| HARQ process number | set to all '0's | set to all '0's | set to all '0's |
| Redundancy version | set to all '0's | set to all '0's | For the enabled transport block: set to all '0's |

TABLE 3

| | DCI format 0_0/0_1/0_2 | DCI format 1_0/1_1/1_2 |
|---|---|---|
| HARQ process number | set to all '0's | set to all '0's |
| Redundancy version | set to all '0's | set to all '0's |
| Modulation and coding scheme | set to all '1's | set to all '1's |
| Frequency domain resource assignment ("FDRA") | set to all '0's for FDRA Type-2 with $\mu = 1$<br>set to all '1's, otherwise | set to all '0's for FDRA Type 0 or for dynamicSwitch<br>set to all '1's for FDRA Type-1 |

If the UE 205 is provided more than one configurations for UL grant Type-2 PUSCH or for SPS PDSCH, a value of the HARQ process number field in a DCI format indicates an activation for a corresponding UL grant Type-2 PUSCH or for a SPS PDSCH configuration with a same value as provided by ConfiguredGrantConfigIndex or by sps-ConfigIndex, respectively. Validation of the DCI format is achieved if the RV field for the DCI format is set as in Table 4 (taken from 3GPP TS 38.213, Table 10.2-3). Table 4 shows special fields for a single DL SPS or single UL grant Type-2 scheduling activation PDCCH validation when the UE 205 is provided multiple DL SPS or UL grant Type-2 configurations in the active DL/UL BWP of the scheduled cell.

TABLE 4

| | DCI format 0_0/0_1/0_2 | DCI format 1_0/1_2 | DCI format 1_1 |
|---|---|---|---|
| Redundancy version | set to all '0's | set to all '0's | For the enabled transport block: set to all '0's |

Where a UE 205 is provided more than one configuration for UL grant Type-2 PUSCH or for SPS PDSCH, if the UE 205 is provided ConfiguredGrantConfigType2DeactivationStateList or sps-ConfigDeactivationStateList, then a value of the HARQ process number field in a DCI format indicates a corresponding entry for scheduling release of one or more UL grant Type-2 PUSCH or SPS PDSCH configurations. However, if the UE 205 is not provided ConfiguredGrantConfigType2DeactivationStateList or sps-ConfigDeactivationStateList, then a value of the HARQ process number field in a DCI format indicates a release for a corresponding UL grant Type-2 PUSCH or for a SPS PDSCH configuration with a same value as provided by ConfiguredGrantConfigIndex or by sps-ConfigIndex, respectively.

Validation of the DCI format is achieved if all fields for the DCI format are set according to Table 5 (taken from 3GPP TS 38.213, Table 10.2-4). Table 5 shows special fields for a single or multiple DL SPS and UL grant Type-2 scheduling release PDCCH validation when the UE 205 is provided multiple DL SPS or UL grant Type-2 configurations in the active DL/UL BWP of the scheduled cell. If validation is achieved, the UE 205 considers the information in the DCI format as a valid activation or valid release of DL SPS or configured UL grant Type-2. If validation is not achieved, the UE 205 discards all the information in the DCI format.

TABLE 5

| | DCI format 0_0/0_1/0_2 | DCI format 1_0/1_1/1_2 |
|---|---|---|
| Redundancy version | set to all '0's | set to all '0's |
| Modulation and coding scheme | set to all '1's | set to all '1's |
| Frequency domain resource assignment | set to all '0's for FDRA Type-2 with $\mu$ = 1<br>set to all '1's, otherwise | set to all '0's for FDRA Type 0 or for dynamicSwitch<br>set to all '1's for FDRA Type-1 |

A UE 205 is expected to provide HARQ-ACK information in response to a SPS PDSCH release after N symbols from the last symbol of a PDCCH providing the SPS PDSCH release. If processingType2Enabled of PDSCH-ServingCellConfig is set to enable for the serving cell with the PDCCH providing the SPS PDSCH release, N=5 for $\mu$=0, N=5.5 for $\mu$=1, and N=11 for $\mu$=2, otherwise, N=10 for $\mu$=0, N=12 for $\mu$=1, N=22 for $\mu$=2, and N=25 for $\mu$=3, wherein $\mu$ corresponds to the smallest subcarrier spacing ("SCS") configuration between the SCS configuration of the PDCCH providing the SPS PDSCH release and the SCS configuration of a PUCCH carrying the HARQ-ACK information in response to a SPS PDSCH release.

FIGS. 7A-7B depict an exemplary ConfiguredGrantConfig information element ("IE"), according to embodiments of the disclosure. The IE ConfiguredGrantConfig is used to configure uplink transmission without dynamic grant according to two possible schemes. The actual uplink grant may either be configured via RRC (type1) or provided via the PDCCH (addressed to CS-RNTI) (type2). Multiple Configured Grant configurations may be configured in one BWP of a serving cell.

Figure 8:
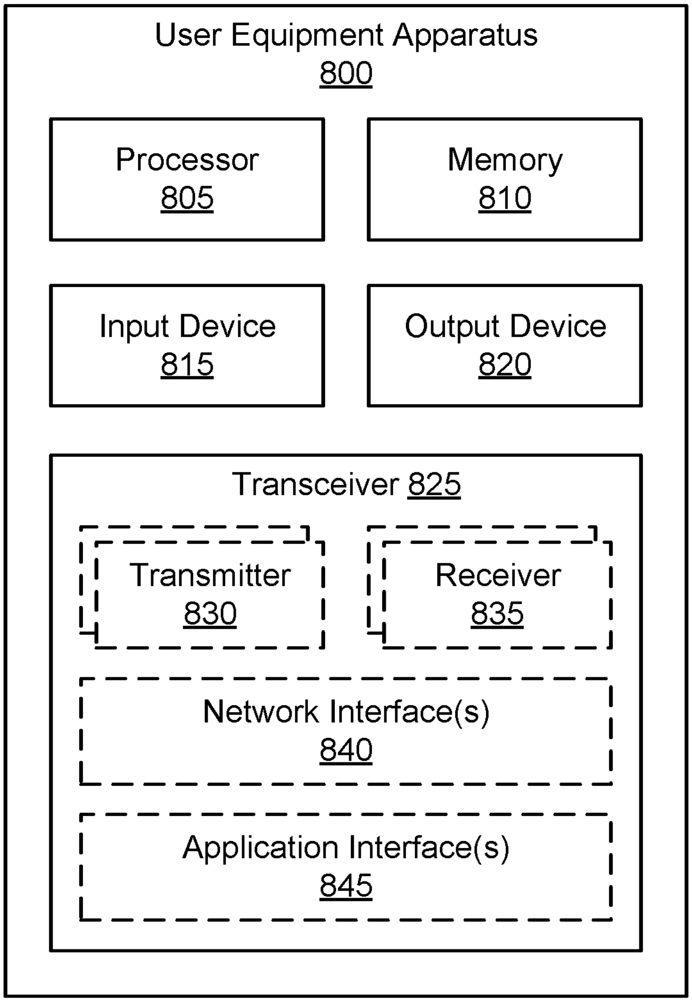
FIG. 8 is a block diagram illustrating one embodiment of a user equipment apparatus that may be used for modifying L1 parameters for CG resource.

FIG. 8 depicts a user equipment apparatus 800 that may be used for modifying L1 parameters for CG resource, according to embodiments of the disclosure. In various embodiments, the user equipment apparatus 800 is used to implement one or more of the solutions described above. The user equipment apparatus 800 may be one embodiment of the remote unit 105, the UE 205, and/or the user equipment apparatus 800, described above. Furthermore, the user equipment apparatus 800 may include a processor 805, a memory 810, an input device 815, an output device 820, and a transceiver 825.

In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. In some embodiments, the transceiver 825 communicates with one or more cells (or wireless coverage areas) supported by one or more base units 121. In various embodiments, the transceiver 825 is operable on unlicensed spectrum. Moreover, the transceiver 825 may include multiple UE panels supporting one or more beams. Additionally, the transceiver 825 may support at least one network interface 840 and/or application interface 845. The application interface(s) 845 may support one or more APIs. The network interface(s) 840 may support 3GPP reference points, such as Uu, N1, PC5, etc. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the processor 805 controls the user equipment apparatus 800 to implement the above described UE behaviors. In certain embodiments, the processor 805 may include an application processor (also known as "main processor") which manages application-domain and operating system ("OS") functions and a baseband processor (also known as "baseband radio processor") which manages radio functions.

In various embodiments, the transceiver 825 receives an RRC configuration for at least one UL Type-2 CG resource and further receives a first DCI to activate the at least one UL Type-2 CG resource. Via the transceiver 825, the processor 805 performs at least one first PUSCH transmission on the at least one activated UL Type-2 CG resource according to parameters configured by the RRC configuration, the first DCI, or some combination thereof. The transceiver 825 further receives a second DCI that updates at least one L1 parameter for the at least one activated UL Type-2 CG resource and the processor 805 further performs (i.e., via the transceiver 825) at least one second PUSCH transmission on the at least one activated UL Type-2 CG resources according to the at least one L1 parameter updated by the second DCI.

In some embodiments, the first DCI indicates a type of repetition and a number of repetitions of a PUSCH transmission, where the RRC configuration does not indicate any type of repetition or number of repetitions of the PUSCH transmission. In some embodiments, the first DCI contains a plurality of modified L1 parameters for the at least one UL Type-2 CG, said plurality of modified L1 parameters selected from: a TCI state, an SRS resource indicator, a number of repetitions, a priority indicator, a MCS table, and an open loop power control parameter.

In some embodiments, the processor 805 applies the at least one L1 parameter updated by the second DCI for a fixed duration of time and reverts the at least one L1 parameter updated by the second DCI after expiration of the fixed duration of time. In some embodiments, the second DCI contains a plurality of updated L1 parameters for the at least one UL Type-2 CG, said plurality of updated L1 parameters selected from: a TCI state, an SRS resource indicator, a number of repetitions, a priority indicator, a MCS table, and an open loop power control parameter.

In some embodiments, the second DCI is an activation DCI that contains at least one (e.g., extraneous) validation field, the validation field being a RV field and/or HARQ process field. In such embodiments, the processor 805 further ignores the at least one validation field in the activation DCI.

In some embodiments, the second DCI contains a modified priority indicator that increases the priority of the PUSCH transmission on the at least one activated UL Type-2 CG resource. In certain embodiments, the modified priority indicator is set to a highest value. In such embodiments, the processor 805 controls the transceiver 825 to transmit one or more PUSCH repetitions in a dynamic flexible symbol during a survival time associated with the PUSCH transmission.

In one embodiment, the processor 805 reverts the modified priority of the PUSCH transmission to a previously configured priority value after receiving a predetermined number of consecutive positive acknowledgements (i.e., one or 'N' consecutive ACK). In another embodiment, the processor 805 reverts the modified priority of the PUSCH transmission to a previously configured priority value after the expiry of a survival timer associated with the PUSCH transmission.

In some embodiments, the second DCI is scrambled using a CS-RNTI of the communication device. In such embodiments, the second DCI may contain a plurality of modified L1 parameters for the at least one UL Type-2 CG, said plurality of modified L1 parameter selected from: a TCI state, a number of repetitions, a priority indicator, and an open loop power control parameter. In certain embodiments, the processor 805 further ignores a non-toggled NDI for retransmission grant in response to receiving the second DCI scrambled by CS-RNTI.

In some embodiments, the second DCI disables a feature during a survival time associated with the PUSCH transmission. In such embodiments, the disabled feature may be one or more of: HARQ acknowledgement (i.e., Ack/Nack) deferral and/or SPS acknowledgement (i.e., Ack/Nack) skipping. In one embodiment, the processor 805 further enables the disabled feature (e.g., HARQ-Ack/Nack deferral and/or SPS-Ack/Nack skipping) after receiving a predetermined number of consecutive positive acknowledgements (i.e., one or 'N' consecutive ACK). In another embodiment, the processor 805 further enables the disabled feature (e.g., HARQ-Ack/Nack deferral and/or SPS-Ack/Nack skipping) after expiry of a predetermined time since receiving the second DCI (i.e., the activation DCI that disables the feature command).

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to modifying L1 parameters for CG resource. For example, the memory 810 may store various parameters, panel/beam configurations, resource assignments, policies, and the like as described above. In certain embodiments, the memory 810 also stores program code and related data, such as an operating system or other controller algorithms operating on the apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 communicates with one or more network functions of a mobile communication network via one or more access networks. The transceiver 825 operates under the control of the processor 805 to transmit messages, data, and other signals and also to receive messages, data, and other signals. For example, the processor 805 may selectively activate the transceiver 825 (or portions thereof) at particular times in order to send and receive messages.

The transceiver 825 includes at least transmitter 830 and at least one receiver 835. One or more transmitters 830 may be used to provide UL communication signals to a base unit 121, such as the UL transmissions described herein. Similarly, one or more receivers 835 may be used to receive DL communication signals from the base unit 121, as described herein. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
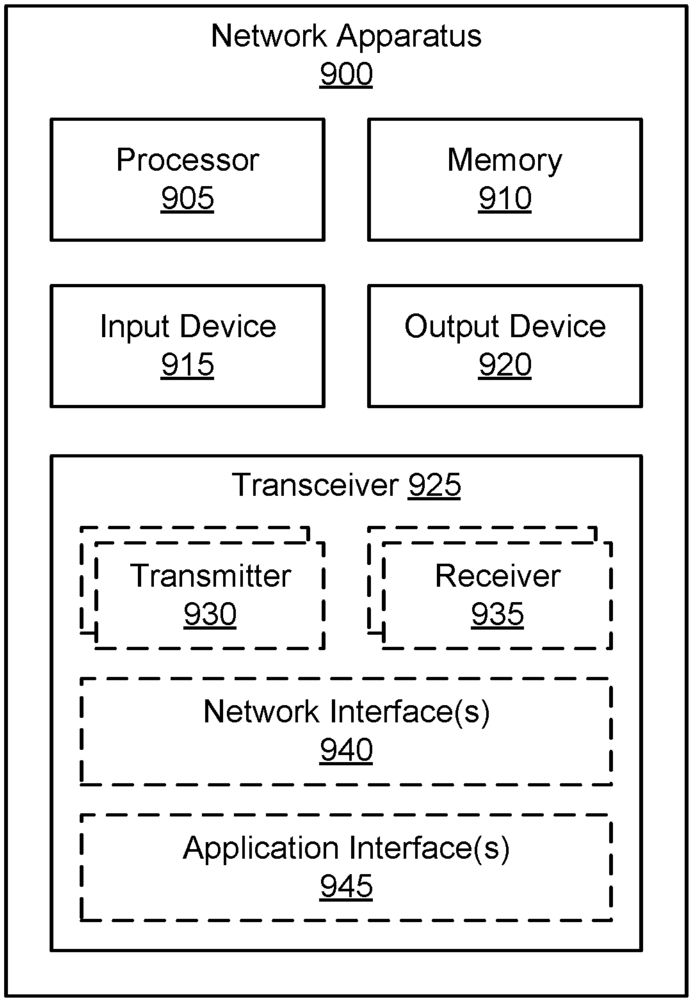
FIG. 9 is a block diagram illustrating one embodiment of a network apparatus that may be used for modifying L1 parameters for CG resource.

FIG. 9 depicts a network apparatus 900 that may be used for modifying L1 parameters for CG resource, according to embodiments of the disclosure. In one embodiment, network apparatus 900 may be one implementation of a RAN device, such as the base unit 121, as described above. Furthermore, the network apparatus 900 may include a processor 905, a memory 910, an input device 915, an output device 920, and a transceiver 925.

In some embodiments, the input device 915 and the output device 920 are combined into a single device, such as a touchscreen. In certain embodiments, the network apparatus 900 may not include any input device 915 and/or output device 920. In various embodiments, the network apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. Here, the transceiver 925 communicates with one or more remote units 105. Additionally, the transceiver 925 may support at least one network interface 940 and/or application interface 945. The application interface(s) 945 may support one or more APIs. The network interface(s) 940 may support 3GPP reference points, such as Uu, N1, N2 and N3. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a CPU, a GPU, an auxiliary processing unit, a FPGA, or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925.

In various embodiments, the network apparatus 900 is a RAN node (e.g., gNB) that communicates with one or more UEs, as described herein. In such embodiments, the processor 905 controls the network apparatus 900 to perform the above described RAN behaviors. When operating as a RAN node, the processor 905 may include an application processor (also known as "main processor") which manages application-domain and operating system ("OS") functions and a baseband processor (also known as "baseband radio processor") which manages radio functions.

In various embodiments, the processor 905 controls the transceiver 925 to transmit a RRC configuration to a UE (i.e., a communication device) for at least one UL Type-2 CG resource. Via the transceiver 925, the processor 905 transmits a first DCI to the UE to activate the at least one UL Type-2 CG resource and monitors for (i.e., attempts to receive) at least one first PUSCH transmission on the at least one activated UL Type-2 CG resource according to parameters configured by the RRC configuration, the first DCI, or some combination thereof. Note that the processor 905 may be unable to successfully receive and decode a PUSCH transmission from the UE.

Accordingly, the processor 905 may determine to update one or more L1 parameters, e.g., in order to increase reliability of PUSCH reception. Via the transceiver 925, the processor 905 transmits a second DCI to the UE that updates at least one L1 parameter for the at least one activated UL Type-2 CG resource and monitors for (i.e., attempts to receive) at least one second PUSCH transmission on the at least one activated UL Type-2 CG resources according to the at least one L1 parameter updated by the second DCI.

In some embodiments, the RRC configuration does not indicate any type of repetition or number of repetitions of the PUSCH transmission, and the first DCI indicates a type of repetition and a number of repetitions of a PUSCH transmission. In some embodiments, the first DCI contains a plurality of modified L1 parameters for the at least one UL Type-2 CG, said plurality of modified L1 parameters selected from: a TCI state, an SRS resource indicator, a number of repetitions, a priority indicator, a MCS table, and an open loop power control parameter.

In some embodiments, the UE is configured to apply the at least one L1 parameter updated by the second DCI for a fixed duration of time and to revert the at least one L1 parameter updated by the second DCI after expiration of the fixed duration of time. In such embodiments, monitoring for at least one second PUSCH transmission according to the at least one L1 parameter updated by the second DCI includes monitoring during the fixed duration of time. In some embodiments, the second DCI contains a plurality of updated L1 parameters for the at least one UL Type-2 CG, said plurality of updated L1 parameters selected from: a TCI state, an SRS resource indicator, a number of repetitions, a priority indicator, a MCS table, and an open loop power control parameter.

In some embodiments, the second DCI contains a modified priority indicator that increases the priority of the PUSCH transmission on the at least one activated UL Type-2 CG resource. In certain embodiments, processor 905 sets the modified priority indicator to a highest value. In such embodiments, the transceiver 925 further monitors for one or more PUSCH repetitions in a dynamic flexible symbol during a survival time associated with the PUSCH transmission.

In one embodiment, the processor 905 reverts the modified priority of the PUSCH transmission to a previously configured priority value after receiving a predetermined number (i.e., one or N) of consecutive positive acknowledgements (i.e., ACK). In another embodiment, the processor 905 reverts the modified priority of the PUSCH transmission to a previously configured priority value after the expiry of a survival timer associated with the PUSCH transmission.

In some embodiments, the processor 905 further scrambles the second DCI using a CS-RNTI of the UE. In such embodiments, the second DCI may contain a plurality of modified L1 parameters for the at least one UL Type-2 CG, said plurality of modified L1 parameter selected from: a TCI state, a number of repetitions, a priority indicator, and an open loop power control parameter.

In some embodiments, the second DCI disables a feature during a survival time associated with the PUSCH transmission, said feature being one or more of. HARQ acknowledgement (i.e., Ack/Nack) deferral and/or disables SPS acknowledgement (i.e., Ack/Nack) skipping. In one embodiment, the processor 905 further enables the disabled feature (e.g., HARQ-Ack/Nack deferral and/or SPS-Ack/Nack skipping) after receiving a predetermined number (i.e., one or N) of consecutive positive acknowledgements (i.e., ACK). In another embodiment, the processor 905 further enables the disabled feature (e.g., HARQ-Ack/Nack deferral and/or SPS-Ack/Nack skipping) after expiry of a predetermined time since receiving the second DCI (i.e., the activation DCI that disables the feature command).

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to modifying L1 parameters for CG resource. For example, the memory 910 may store parameters, configurations, resource assignments, policies, and the like, as described above. In certain embodiments, the memory 910 also stores program code and related data, such as an operating system or other controller algorithms operating on the apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the network apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, the output device 920 may be located near the input device 915.

The transceiver 925 includes at least transmitter 930 and at least one receiver 935. One or more transmitters 930 may be used to communicate with the UE, as described herein. Similarly, one or more receivers 935 may be used to communicate with network functions in the Public Land Mobile Network ("PLMN") and/or RAN, as described herein. Although only one transmitter 930 and one receiver 935 are illustrated, the network apparatus 900 may have any suitable number of transmitters 930 and receivers 935. Further, the transmitter(s) 930 and the receiver(s) 935 may be any suitable type of transmitters and receivers.

Figure 10:
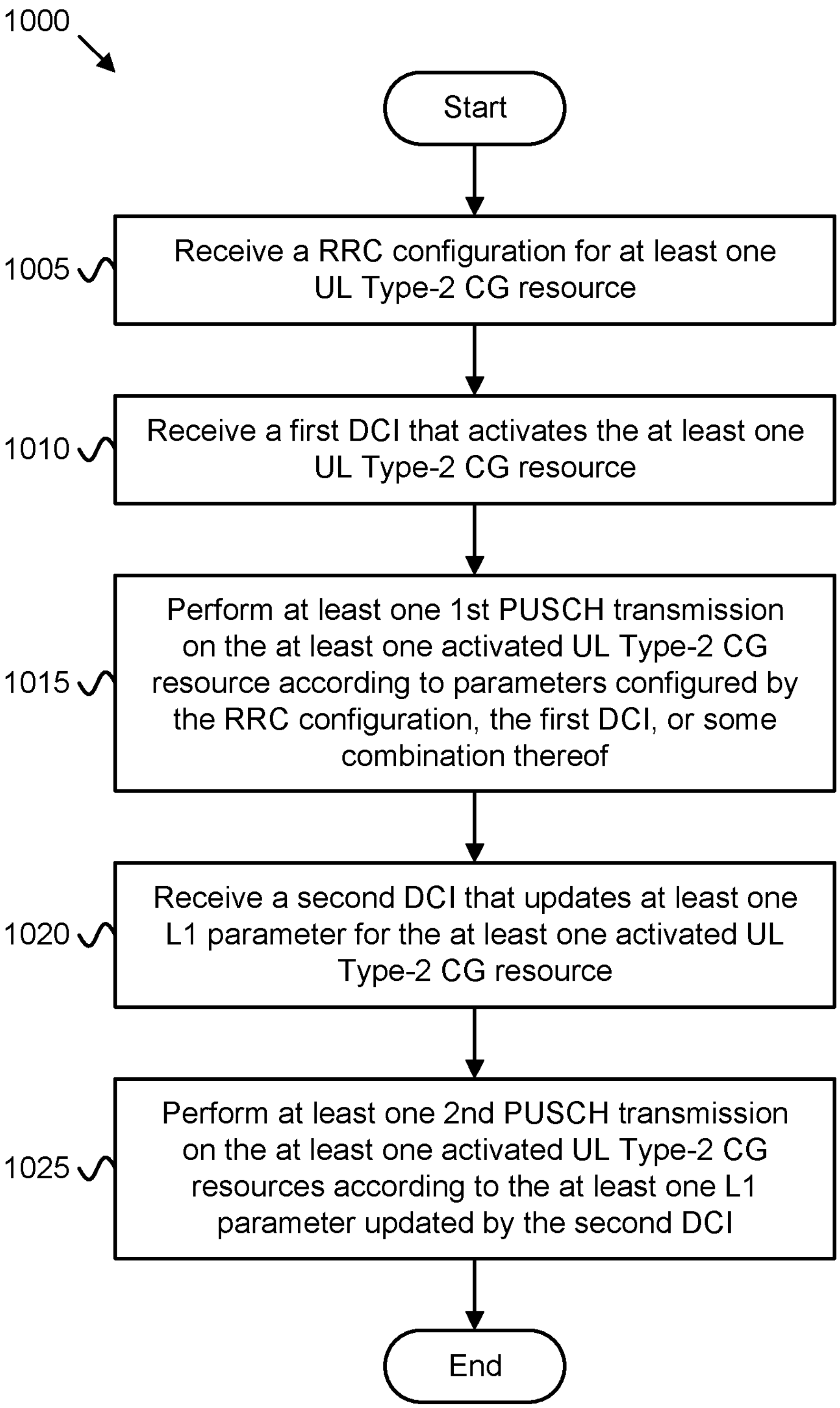
FIG. 10 is a flowchart diagram illustrating one embodiment of a first method for modifying L1 parameters for CG resource.

FIG. 10 depicts one embodiment of a method 1000 for modifying L1 parameters for CG resource, according to embodiments of the disclosure. In various embodiments, the method 1000 is performed by a communication device, such as the remote unit 105, the UE 205, and/or the user equipment apparatus 800, described above as described above. In some embodiments, the method 1000 is performed by a processor, such as a microcontroller, a microprocessor, a CPU, a GPU, an auxiliary processing unit, a FPGA, or the like.

The method 1000 begins and receives 1005 a RRC configuration for at least one UL Type-2 CG resource. The method 1000 includes receiving 1010 a first DCI that activates the at least one UL Type-2 CG resource. The method 1000 includes performing 1015 at least one first PUSCH transmission on the at least one activated UL Type-2 CG resource according to parameters configured by the RRC configuration, the first DCI, or some combination thereof. The method 1000 includes receiving 1020 a second DCI that updates at least one L1 parameter for the at least one activated UL Type-2 CG resource. The method 1000 includes performing 1025 at least one second PUSCH transmission on the at least one activated UL Type-2 CG resources according to the at least one L1 parameter updated by the second DCI. The method 1000 ends.

Figure 11:
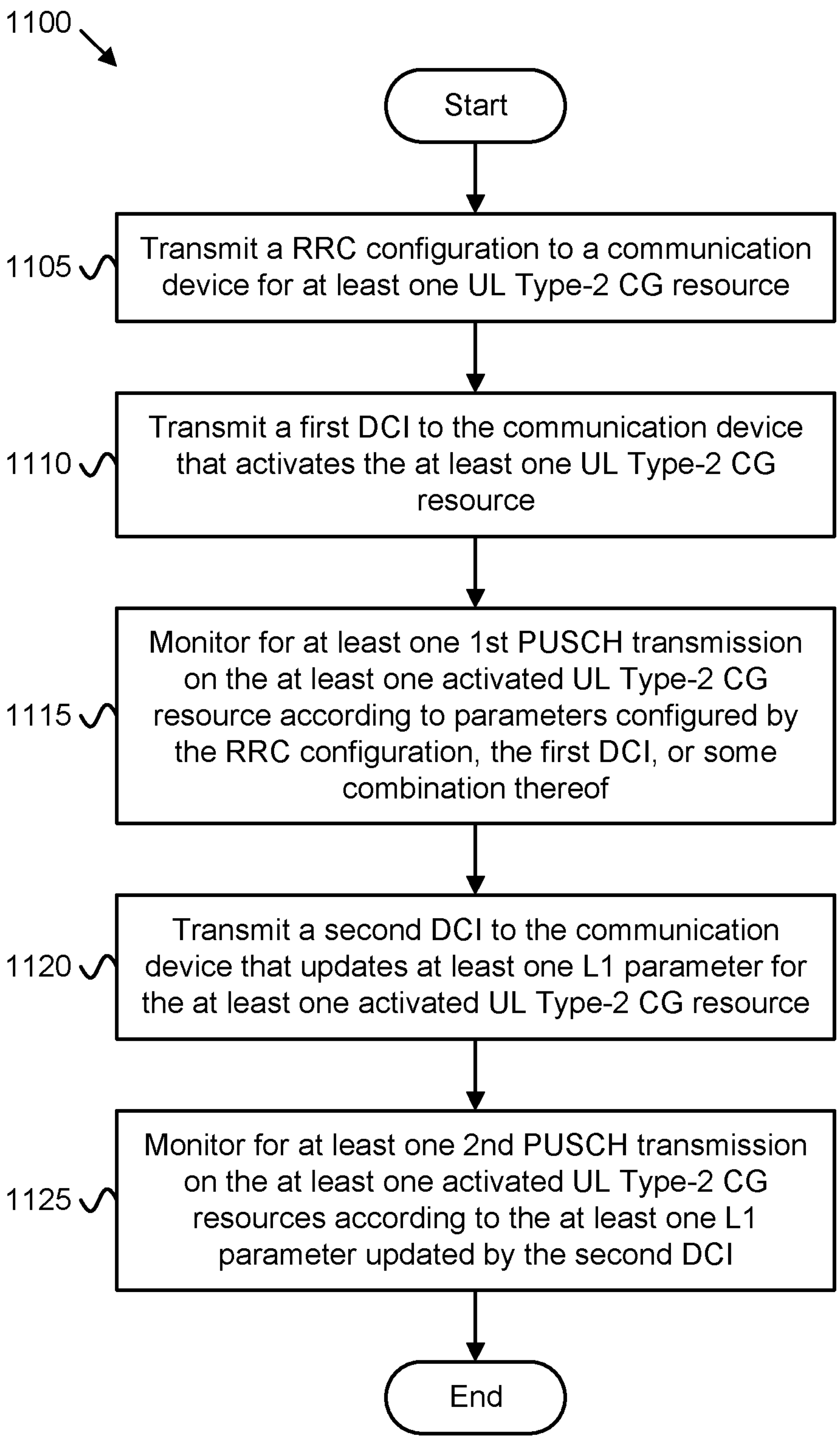
FIG. 11 is a flowchart diagram illustrating one embodiment of a second method for modifying L1 parameters for CG resource.

FIG. 11 depicts one embodiment of a method 1100 for modifying L1 parameters for CG resource, according to embodiments of the disclosure. In various embodiments, the method 1100 is performed by a network entity, such as the base unit 121, the RAN node 210, and/or the network apparatus 900, described above as described above. In some embodiments, the method 1100 is performed by a processor, such as a microcontroller, a microprocessor, a CPU, a GPU, an auxiliary processing unit, a FPGA, or the like.

The method 1100 begins and transmits 1105 a RRC configuration to a communication device (i.e., a UE) for at least one UL Type-2 CG resource. The method 1100 includes transmitting 1110 a first DCI to the communication device that activates the at least one UL Type-2 CG resource. The method 1100 includes monitoring 1115 for at least one first PUSCH transmission on the at least one activated UL Type-2 CG resource according to parameters configured by the RRC configuration, the first DCI, or some combination thereof. The method 1100 includes transmitting 1120 a second DCI to the communication device that updates at least one L1 parameter for the at least one activated UL Type-2 CG resource. The method 1100 includes monitoring 1125 for at least one second PUSCH transmission on the at least one activated UL Type-2 CG resources according to the at least one L1 parameter updated by the second DCI. The method 1100 ends.

Disclosed herein is a first apparatus for modifying L1 parameters for CG resource, according to embodiments of the disclosure. The first apparatus may be implemented by a UE device, such as the remote unit 105, the UE 205, and/or the user equipment apparatus 800, described above. The first apparatus includes a processor and a transceiver that receives an RRC configuration for at least one UL Type-2 CG resource and further receives a first DCI to activate the at least one UL Type-2 CG resource. Via the transceiver, the processor performs at least one first PUSCH transmission on the at least one activated UL Type-2 CG resource according to parameters configured by the RRC configuration, the first DCI, or some combination thereof. The transceiver further receives a second DCI that updates at least one L1 parameter for the at least one activated UL Type-2 CG resource and the processor further performs (i.e., via the transceiver) at least one second PUSCH transmission on the at least one activated UL Type-2 CG resources according to the at least one L1 parameter updated by the second DCI.

In some embodiments, the first DCI indicates a type of repetition and a number of repetitions of a PUSCH transmission, where the RRC configuration does not indicate any type of repetition or number of repetitions of the PUSCH transmission. In some embodiments, the first DCI contains a plurality of modified L1 parameters for the at least one UL Type-2 CG, said plurality of modified L1 parameters selected from: a TCI state, an SRS resource indicator, a number of repetitions, a priority indicator, a MCS table, and an open loop power control parameter.

In some embodiments, the processor applies the at least one L1 parameter updated by the second DCI for a fixed duration of time and reverts the at least one L1 parameter updated by the second DCI after expiration of the fixed duration of time. In some embodiments, the second DCI contains a plurality of updated L1 parameters for the at least one UL Type-2 CG, said plurality of updated L1 parameters selected from: a TCI state, an SRS resource indicator, a number of repetitions, a priority indicator, a MCS table, and an open loop power control parameter.

In some embodiments, the second DCI is an activation DCI that contains at least one (e.g., extraneous) validation field, the validation field being a RV field and/or HARQ process field. In such embodiments, the processor further ignores the at least one validation field in the activation DCI.

In some embodiments, the second DCI contains a modified priority indicator that increases the priority of the PUSCH transmission on the at least one activated UL Type-2 CG resource. In certain embodiments, the modified priority indicator is set to a highest value. In such embodiments, the processor controls the transceiver to transmit one or more PUSCH repetitions in a dynamic flexible symbol during a survival time associated with the PUSCH transmission.

In one embodiment, the processor reverts the modified priority of the PUSCH transmission to a previously configured priority value after receiving a predetermined number (i.e., one or N) of consecutive positive acknowledgements (i.e., ACK). In another embodiment, the processor reverts the modified priority of the PUSCH transmission to a previously configured priority value after the expiry of a survival timer associated with the PUSCH transmission.

In some embodiments, the second DCI is scrambled using a CS-RNTI of the communication device. In such embodiments, the second DCI may contain a plurality of modified L1 parameters for the at least one UL Type-2 CG, said plurality of modified L1 parameter selected from: a TCI state, a number of repetitions, a priority indicator, and an open loop power control parameter. In certain embodiments, the processor further ignores a non-toggled NDI for retransmission grant in response to receiving the second DCI scrambled by CS-RNTI.

In some embodiments, the second DCI disables a feature during a survival time associated with the PUSCH transmission. In such embodiments, the disabled feature may be one or more of: HARQ acknowledgement (i.e., Ack/Nack) deferral and/or SPS acknowledgement (i.e., Ack/Nack) skipping. In one embodiment, the processor further enables the disabled feature (e.g., HARQ-Ack/Nack deferral and/or SPS-Ack/Nack skipping) after receiving a predetermined number (i.e., one or N) of consecutive positive acknowledgements (i.e., ACK). In another embodiment, the processor further enables the disabled feature (e.g., HARQ-Ack/Nack deferral and/or SPS-Ack/Nack skipping) after expiry of a predetermined time since receiving the second DCI (i.e., the activation DCI that disables the feature command).

Disclosed herein is a first method for modifying L1 parameters for CG resource, according to embodiments of the disclosure. The first method may be performed by a UE device, such as the remote unit 105, the UE 205, and/or the user equipment apparatus 800, described above. The first method includes receiving a RRC configuration for at least one UL Type-2 CG resource. The first method includes receiving a first DCI to activate the at least one UL Type-2 CG resource and performing at least one first PUSCH transmission on the at least one activated UL Type-2 CG resource according to parameters configured by the RRC configuration, the first DCI, or some combination thereof. The first method includes receiving a second DCI that updates at least one L1 parameter for the at least one activated UL Type-2 CG resource and performing at least one second PUSCH transmission on the at least one activated UL Type-2 CG resources according to the at least one L1 parameter updated by the second DCI.

In some embodiments, the first DCI indicates a type of repetition and a number of repetitions of a PUSCH transmission, where the RRC configuration does not indicate any type of repetition or number of repetitions of the PUSCH transmission. In some embodiments, the first DCI contains a plurality of modified L1 parameters for the at least one UL Type-2 CG, said plurality of modified L1 parameters selected from: a TCI state, an SRS resource indicator, a number of repetitions, a priority indicator, a MCS table, and an open loop power control parameter.

In some embodiments, the first method further includes applying the at least one L1 parameter updated by the second DCI for a fixed duration of time and reverting the at least one L1 parameter updated by the second DCI after expiration of the fixed duration of time. In some embodiments, the second DCI contains a plurality of updated L1 parameters for the at least one UL Type-2 CG, said plurality of updated L1 parameters selected from: a TCI state, an SRS resource indicator, a number of repetitions, a priority indicator, a MCS table, and an open loop power control parameter.

In some embodiments, the second DCI is an activation DCI that contains at least one (e.g., extraneous) validation field, the validation field being a RV field and/or HARQ process field. In such embodiments, the first method further includes ignoring the at least one validation field in the activation DCI.

In some embodiments, the second DCI contains a modified priority indicator that increases the priority of the PUSCH transmission on the at least one activated UL Type-2 CG resource. In certain embodiments, the modified priority indicator is set to a highest value. In such embodiments, the first method further includes transmitting one or more PUSCH repetitions in a dynamic flexible symbol during a survival time associated with the PUSCH transmission.

In one embodiment, the priority of the PUSCH transmission reverts to a previously configured priority value after receiving a predetermined number (i.e., one or N) of consecutive positive acknowledgements (i.e., ACK). In another embodiment, the priority of the PUSCH transmission reverts to a previously configured priority value after expiry of a survival timer associated with the PUSCH transmission.

In some embodiments, the second DCI is scrambled using a CS-RNTI of the communication device. In such embodiments, the second DCI may contain a plurality of modified L1 parameters for the at least one UL Type-2 CG, said plurality of modified L1 parameter selected from: a TCI state, a number of repetitions, a priority indicator, and an open loop power control parameter. In certain embodiments, the first method further includes ignoring a non-toggled NDI for retransmission grant in response to receiving the second DCI scrambled by CS-RNTI.

In some embodiments, the second DCI disables a feature during a survival time associated with the PUSCH transmission, said feature being one or more of: HARQ acknowledgement (i.e., Ack/Nack) deferral and/or disables SPS acknowledgement (i.e., Ack/Nack) skipping. In one embodiment, the first method includes enabling the disabled feature (e.g., HARQ-Ack/Nack deferral and/or SPS-Ack/Nack skipping) after receiving a predetermined number (i.e., one or N) of consecutive positive acknowledgements (i.e., ACKs). In another embodiment, the first method includes enabling the disabled feature (e.g., HARQ-Ack/Nack deferral and/or SPS-Ack/Nack skipping) after expiry of a predetermined time since receiving the second DCI (i.e., the activation DCI that disables the feature command).

Disclosed herein is a second apparatus for modifying L1 parameters for CG resource, according to embodiments of the disclosure. The second apparatus may be implemented by a network entity, such as the base unit 121, the RAN node 210, and/or the network apparatus 900, described above. The second apparatus includes a processor and a transceiver that transmits a RRC configuration to a communication device (i.e., a UE) for at least one UL Type-2 CG resource. Via the transceiver, the processor transmits a first DCI to the communication device to activate the at least one UL Type-2 CG resource and monitors for at least one first PUSCH transmission on the at least one activated UL Type-2 CG resource according to parameters configured by the RRC configuration, the first DCI, or some combination thereof. Via the transceiver, the processor transmits a second DCI to the communication device that updates at least one L1 parameter for the at least one activated UL Type-2 CG resource and monitors for at least one second PUSCH transmission on the at least one activated UL Type-2 CG resources according to the at least one L1 parameter updated by the second DCI.

In some embodiments, the RRC configuration does not indicate any type of repetition or number of repetitions of the PUSCH transmission, and the first DCI indicates a type of repetition and a number of repetitions of a PUSCH transmission. In some embodiments, the first DCI contains a plurality of modified L1 parameters for the at least one UL Type-2 CG, said plurality of modified L1 parameters selected from: a TCI state, an SRS resource indicator, a number of repetitions, a priority indicator, a MCS table, and an open loop power control parameter.

In some embodiments, the communication device is configured to apply the at least one L1 parameter updated by the second DCI for a fixed duration of time and to revert the at least one L1 parameter updated by the second DCI after expiration of the fixed duration of time. In such embodiments, monitoring for at least one second PUSCH transmission according to the at least one L1 parameter updated by the second DCI includes monitoring during the fixed duration of time. In some embodiments, the second DCI contains a plurality of updated L1 parameters for the at least one UL Type-2 CG, said plurality of updated L1 parameters selected from: a TCI state, an SRS resource indicator, a number of repetitions, a priority indicator, a MCS table, and an open loop power control parameter.

In some embodiments, the second DCI contains a modified priority indicator that increases the priority of the PUSCH transmission on the at least one activated UL Type-2 CG resource. In certain embodiments, processor sets the modified priority indicator to a highest value. In such embodiments, the transceiver further monitors for one or more PUSCH repetitions in a dynamic flexible symbol during a survival time associated with the PUSCH transmission.

In one embodiment, the processor reverts the modified priority of the PUSCH transmission to a previously configured priority value after receiving a predetermined number (i.e., one or N) of consecutive positive acknowledgements (i.e., ACK). In another embodiment, the processor reverts the modified priority of the PUSCH transmission to a previously configured priority value after the expiry of a survival timer associated with the PUSCH transmission.

In some embodiments, the processor further scrambles the second DCI using a CS-RNTI of the communication device. In such embodiments, the second DCI may contain a plurality of modified L1 parameters for the at least one UL Type-2 CG, said plurality of modified L1 parameter selected from: a TCI state, a number of repetitions, a priority indicator, and an open loop power control parameter.

In some embodiments, the second DCI disables a feature during a survival time associated with the PUSCH transmission, said feature being one or more of: HARQ acknowledgement (i.e., Ack/Nack) deferral and/or disables SPS acknowledgement (i.e., Ack/Nack) skipping. In one embodiment, the processor further enables the disabled feature (e.g., HARQ-Ack/Nack deferral and/or SPS-Ack/Nack skipping) after receiving a predetermined number (i.e., one or N) of consecutive positive acknowledgements (i.e., ACK). In another embodiment, the processor further enables the disabled feature (e.g., HARQ-Ack/Nack deferral and/or SPS-Ack/Nack skipping) after expiry of a predetermined time since receiving the second DCI (i.e., the activation DCI that disables the feature command).

Disclosed herein is a second method for modifying L1 parameters for CG resource, according to embodiments of the disclosure. The second method may be performed by a network entity, such as the base unit 121, the RAN node 210, and/or the network apparatus 900, described above. The second method includes transmitting a RRC configuration to a communication device (i.e., a UE) for at least one UL Type-2 CG resource. The second method includes transmitting a first DCI to the communication device to activate the at least one UL Type-2 CG resource and monitoring for at least one first PUSCH transmission on the at least one activated UL Type-2 CG resource according to parameters configured by the RRC configuration, the first DCI, or some combination thereof. The second method includes transmitting a second DCI to the communication device that updates at least one L1 parameter for the at least one activated UL Type-2 CG resource and monitoring for at least one second PUSCH transmission on the at least one activated UL Type-2 CG resources according to the at least one L1 parameter updated by the second DCI.

In some embodiments, the RRC configuration does not indicate any type of repetition or number of repetitions of the PUSCH transmission, and the first DCI indicates a type of repetition and a number of repetitions of a PUSCH transmission. In some embodiments, the first DCI contains a plurality of modified L1 parameters for the at least one UL Type-2 CG, said plurality of modified L1 parameters selected from: a TCI state, an SRS resource indicator, a number of repetitions, a priority indicator, a MCS table, and an open loop power control parameter.

In some embodiments, the communication device is configured to apply the at least one L1 parameter updated by the second DCI for a fixed duration of time and to revert the at least one L1 parameter updated by the second DCI after expiration of the fixed duration of time. In such embodiments, monitoring for at least one second PUSCH transmission according to the at least one L1 parameter updated by the second DCI includes monitoring during the fixed duration of time. In some embodiments, the second DCI contains a plurality of updated L1 parameters for the at least one UL Type-2 CG, said plurality of updated L1 parameters selected from: a TCI state, an SRS resource indicator, a number of repetitions, a priority indicator, a MCS table, and an open loop power control parameter.

In some embodiments, the second DCI contains a modified priority indicator that increases the priority of the PUSCH transmission on the at least one activated UL Type-2 CG resource. In certain embodiments, the second method includes setting the modified priority indicator to a highest value. In such embodiments, the second method further includes receiving one or more PUSCH repetitions in a dynamic flexible symbol during a survival time associated with the PUSCH transmission.

In one embodiment, the priority of the PUSCH transmission reverts to a previously configured priority value after transmitting a predetermined number (i.e., one or N) of consecutive positive acknowledgements (i.e., ACK). In another embodiment, the priority of the PUSCH transmission reverts to a previously configured priority value after expiry of a survival timer associated with the PUSCH transmission.

In some embodiments, the second method further includes scrambling the second DCI using a CS-RNTI of the communication device. In such embodiments, the second DCI may contain a plurality of modified L1 parameters for the at least one UL Type-2 CG, said plurality of modified L1 parameter selected from: a TCI state, a number of repetitions, a priority indicator, and an open loop power control parameter.

In some embodiments, the second DCI disables a feature during a survival time associated with the PUSCH transmission, said feature being one or more of: HARQ acknowledgement (i.e., Ack/Nack) deferral and/or disables SPS acknowledgement (i.e., Ack/Nack) skipping. In one embodiment, the second method includes enabling the disabled feature (e.g., HARQ-Ack/Nack deferral and/or SPS-Ack/Nack skipping) after receiving a predetermined number (i.e., one or N) of consecutive positive acknowledgements (i.e., ACKs). In another embodiment, the second method includes enabling the disabled feature (e.g., HARQ-Ack/Nack deferral and/or SPS-Ack/Nack skipping) after expiry of a predetermined time since receiving the second DCI (i.e., the activation DCI that disables the feature command).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:

at least one memory; and at least one processor coupled with the at least one memory and configured to cause the UE to:

receive a Radio Resource Control (RRC) configuration for at least one uplink (UL) Type-2 Configured Grant (CG) resource;

receive a first downlink control information (DCI) to activate the at least one UL Type-2 CG resource;

perform at least one first Physical Uplink Shared Channel (PUSCH) transmission on the activated at least one UL Type-2 CG resource according to at least one layer-1 (L1) parameter;

receive a second DCI that updates the at least one L1 parameter for the activated at least one UL Type-2 CG resource, wherein the second DCI is scrambled using a configured scheduling radio network temporary identifier (CS-RNTI) of the UE, wherein the second DCI comprises a plurality of modified L1 parameters for the activated at least one UL Type-2 CG resource, and wherein the plurality of modified L1 parameters comprises a transmission configuration indicator (TCI) state or a sounding reference signal (SRS) resource indicator, or both; and perform at least one second PUSCH transmission on the activated at least one UL Type-2 CG resource according to the updated at least one L1 parameter.

2. The UE of claim 1, wherein the at least one processor is further configured to cause the UE to apply the updated at least one L1 parameter for a duration and to revert the updated at least one L1 parameter after an expiration of the duration.

3. The UE of claim 1, wherein the first DCI indicates a type of repetition and a number of repetitions of the at least one first PUSCH transmission, and wherein the RRC configuration fails to indicate any type of repetition or number of repetitions of the at least one first PUSCH transmission.

4. The UE of claim 1, wherein the first DCI comprises a plurality of L1 parameters for the activated at least one UL Type-2 CG resource, and wherein the plurality of L1 parameters further comprises one or more of: a first TCI state, a first SRS resource indicator, a number of repetitions, a priority indicator, a modulation and coding scheme (MCS), or an open loop power control parameter, or a combination thereof.

5. The UE of claim 1, wherein the second DCI is an activation DCI that comprises at least one validation field, wherein the at least one processor is further configured to cause the UE to ignore the at least one validation field in the activation DCI, and wherein the at least one validation field comprises a redundancy version field, or hybrid automatic repeat request (HARQ) process field, or both.

6. The UE of claim 1, wherein the second DCI comprises a modified priority indicator that increases a priority of the at least one second PUSCH transmission on the activated at least one UL Type-2 CG resource.

7. The UE of claim 6, wherein the modified priority indicator is set to a highest value, and wherein the at least one processor is further configured to cause the UE to transmit one or more PUSCH repetitions in a dynamic flexible symbol during a duration associated with the at least one second PUSCH transmission.

8. The UE of claim 6, wherein the priority of the at least one second PUSCH transmission reverts to a previously configured priority value after one of:

receipt of a predetermined number of consecutive positive acknowledgements; or expiry of a timer associated with the at least one second PUSCH transmission.

9. The UE of claim 1, wherein the plurality of modified L1 parameters further comprises one or more of: a number of repetitions, a priority indicator, or an open loop power control parameter, or a combination thereof.

10. The UE of claim 9, wherein the at least one processor is further configured to cause the UE to ignore a new data indicator (NDI) for a retransmission grant in response to receipt of the second DCI scrambled by the CS-RNTI.

11. The UE of claim 1, wherein the second DCI disables a feature during a duration associated with the at least one second PUSCH transmission, and wherein the feature comprises hybrid automatic repeat request (HARQ) acknowledgement deferral, or semi-persistent scheduling (SPS) acknowledgement skipping, or both.

12. The UE of claim 11, wherein the at least one processor is further configured to cause the UE to re-enable the disabled feature after one of:

receipt of a predetermined number of consecutive positive acknowledgements; or expiry of a predetermined time since receiving the second DCI.

13. A processor for wireless communication, comprising:

at least one controller coupled with at least one memory and configured to cause the processor to:

receive a Radio Resource Control (RRC) configuration for at least one uplink (UL) Type-2 Configured Grant (CG) resource;

receive a first downlink control information (DCI) to activate the at least one UL Type-2 CG resource;

perform at least one first Physical Uplink Shared Channel (PUSCH) transmission on the activated at least one UL Type-2 CG resource according to at least one layer-1 (L1) parameter;

receive a second DCI that updates the at least one L1 parameter for the activated at least one UL Type-2 CG resource, wherein the second DCI is scrambled using a configured scheduling radio network temporary identifier (CS-RNTI) of a user equipment (UE), wherein the second DCI comprises a plurality of modified L1 parameters for the activated at least one UL Type-2 CG resource, and wherein the plurality of modified L1 parameters comprises a transmission configuration indicator (TCI) state or a sounding reference signal (SRS) resource indicator, or both; and perform at least one second PUSCH transmission on the activated at least one UL Type-2 CG resource according to the updated at least one L1 parameter.

14. A base station for wireless communication, comprising:

at least one memory; and at least one processor coupled with the at least one memory and configured to cause the base station to:

transmit, to a user equipment (UE), a Radio Resource Control (RRC) configuration for at least one uplink (UL) Type-2 Configured Grant (CG) resource;

transmit, to the UE, a first downlink control information (DCI) to activate the at least one UL Type-2 CG resource;

monitor for at least one first Physical Uplink Shared Channel (PUSCH) transmission on the activated at least one UL Type-2 CG resource according to at least one layer-1 (L1) parameter;

transmit, to the UE, a second DCI that updates the at least one L1 parameter for the activated at least one UL Type-2 CG resource, wherein the second DCI is scrambled using a Configured Scheduling Radio Network Temporary Identifier (CS-RNTI) of the UE, wherein the second DCI comprises a plurality of modified L1 parameters for the activated at least one UL Type-2 CG resource, and wherein the plurality of modified L1 parameters comprises a transmission configuration indicator (TCI) state or a sounding reference signal (SRS) resource indicator, or both; and monitor for at least one second PUSCH transmission on the activated at least one UL Type-2 CG resource according to the updated at least one L1 parameter.

15. The base station of claim 14, wherein the first DCI indicates a type of repetition and a number of repetitions of the at least one first PUSCH transmission, and wherein the RRC configuration fails to indicate any type of repetition or number of repetitions of the at least one first PUSCH transmission.

16. The base station of claim 14, wherein the plurality of modified L1 parameters further comprises one or more of: a number of repetitions, a priority indicator, a Modulation and Coding Scheme (MCS), or an open loop power control parameter, or a combination thereof.

17. The base station of claim 14, wherein the second DCI comprises a modified priority indicator that increases a priority of the at least one second PUSCH transmission on the activated at least one UL Type-2 CG resource.

18. The base station of claim 14, wherein the plurality of modified L1 parameter further comprises one or more of: a number of repetitions, a priority indicator, or an open loop power control parameter, or a combination thereof.

19. The base station of claim 14, wherein the second DCI disables a feature during a duration associated with the at least one second PUSCH transmission, and wherein the feature comprises Hybrid Automatic Repeat Request (HARQ) acknowledgement deferral, or Semi-Persistent Scheduling (SPS) acknowledgement skipping, or both.

20. A method performed by a base station, the method comprising:

transmitting a Radio Resource Control (RRC) configuration for at least one uplink (UL) Type-2 Configured Grant (CG) resource;

transmitting a first downlink control information (DCI) to activate the at least one UL Type-2 CG resource;

monitoring for at least one first Physical Uplink Shared Channel (PUSCH) transmission on the activated at least one UL Type-2 CG resource according to at least one layer-1 (L1) parameter;

transmitting a second DCI that updates the at least one L1 parameter for the activated at least one UL Type-2 CG resource, wherein the second DCI is scrambled using a Configured Scheduling Radio Network Temporary Identifier (CS-RNTI) of a user equipment (UE), wherein the second DCI comprises a plurality of modified L1 parameters for the activated at least one UL Type-2 CG resource, and wherein the plurality of modified L1 parameters comprises a transmission configuration indicator (TCI) state or a sounding reference signal (SRS) resource indicator, or both; and monitoring for at least one second PUSCH transmission on the activated at least one UL Type-2 CG resource according to the updated at least one L1 parameter.

* * * * *